United States Patent
Lariviere

(10) Patent No.: US 8,434,960 B2
(45) Date of Patent: May 7, 2013

(54) CAPTIVE BOLT MECHANISM AND PROCESS FOR STRUCTURAL ASSEMBLY OF PLANAR COMPONENTS

(75) Inventor: Donald G. Lariviere, Hollywood, CA (US)

(73) Assignee: Applied Minds, LLC, Glendale, CA (US)

( * ) Notice: Subject to any disclaimer, the term of this patent is extended or adjusted under 35 U.S.C. 154(b) by 432 days.

(21) Appl. No.: 12/324,755

(22) Filed: Nov. 26, 2008

(65) Prior Publication Data

US 2010/0129138 A1 May 27, 2010

(51) Int. Cl.
B25G 3/00 (2006.01)

(52) U.S. Cl.
USPC ............................................ 403/22; 411/104

(58) Field of Classification Search .................... 403/21, 403/22, 240, 256, 258–260, 373; 411/103, 411/104
See application file for complete search history.

(56) References Cited

U.S. PATENT DOCUMENTS

| | | | |
|---|---|---|---|
| 321,054 A | 6/1885 | Ritter | |
| 343,807 A | 6/1886 | Field | |
| 470,995 A | 3/1892 | Duchemin | |
| 500,447 A | 6/1893 | Walker | |
| 1,894,061 A | 1/1933 | Sanders | |
| 2,133,204 A | 10/1938 | Max | |
| 2,558,591 A | 6/1951 | Starck | |
| 2,624,386 A | 1/1953 | Russell | |
| 2,825,101 A | 3/1958 | Rubenstein | |
| 2,872,229 A | 2/1959 | Waser | |
| 2,993,573 A * | 7/1961 | Bloedow | 403/258 |
| 3,288,510 A | 11/1966 | Gough et al. | |
| 3,498,655 A * | 3/1970 | Arms et al. | 52/285.2 |
| 3,570,418 A | 3/1971 | Gooding | |
| 3,644,008 A | 2/1972 | Overby | |
| 3,664,011 A | 5/1972 | Labastrou | |
| 3,673,674 A | 7/1972 | Catulle | |

(Continued)

FOREIGN PATENT DOCUMENTS

DE 3710624 C1 * 10/1988

OTHER PUBLICATIONS

Mortise and Tenon [online] Jun. 13, 2008 [retrieved Jul. 9, 2008] retrieved from website: http://en.wikipedia.org/wiki/Mortise_and_tenon.

(Continued)

*Primary Examiner* — Michael P Ferguson
*Assistant Examiner* — Daniel Wiley
(74) *Attorney, Agent, or Firm* — Michael A. Glenn; Glenn Patent Group

(57) ABSTRACT

A captive bolt mechanism joins planar structural members. In an exemplary embodiment, a first structural member has an opening defined there through. The head of a bolt is captured in a fastener slot within a second member, such that the threaded shaft of the bolt protrudes, in-plane, beyond the end of the second member. The threaded shaft is then passed through the opening in the first member and secured with a nut. As the nut is tightened, the underside of the bolt head is drawn against the interior surface of the fastener slot, binding the end of the second member against the surface of the first member. In an alternate embodiment, a nut is similarly confined within the fastener slot, and a bolt or screw is extended through the hole in the first member and the slot in the second member, and is then fastened to the nut.

13 Claims, 23 Drawing Sheets

U.S. PATENT DOCUMENTS

| | | | |
|---|---|---|---|
| 3,695,655 A | 10/1972 | Wippermann | |
| 3,788,700 A | 1/1974 | Wartes | |
| 3,820,294 A | 6/1974 | Parker | |
| 3,835,610 A | 9/1974 | Harper | |
| 3,951,558 A | 4/1976 | Komarov | |
| 4,012,153 A | 3/1977 | Pidgeon | |
| 4,116,510 A * | 9/1978 | Franco | 312/257.1 |
| 4,188,148 A * | 2/1980 | Waibel | 403/258 |
| 4,261,665 A | 4/1981 | Hsiung | |
| 4,299,069 A | 11/1981 | Neumann | |
| 4,405,253 A | 9/1983 | Stockum | |
| 4,602,470 A | 7/1986 | Stuart | |
| 4,632,473 A * | 12/1986 | Smith | 312/265.1 |
| 4,740,098 A | 4/1988 | Witt | |
| 4,818,578 A | 4/1989 | Moghe | |
| 4,981,388 A | 1/1991 | Becken | |
| 5,078,534 A | 1/1992 | White | |
| 5,351,453 A | 10/1994 | Leslie | |
| 5,468,086 A | 11/1995 | Goya | |
| 5,499,885 A | 3/1996 | Chapman | |
| 5,664,899 A | 9/1997 | Eustis | |
| 5,741,083 A | 4/1998 | Schvartz | |
| 5,743,692 A | 4/1998 | Schwarz | |
| 5,798,185 A | 8/1998 | Kato | |
| 5,894,628 A * | 4/1999 | Egner-Walter et al. | 15/250.34 |
| 6,503,020 B1 | 1/2003 | Mascioletti et al. | |
| 6,719,480 B1 * | 4/2004 | Janatka et al. | 403/373 |
| 6,827,028 B1 * | 12/2004 | Callaway | 108/158.12 |
| 7,303,800 B2 | 12/2007 | Rogers | |
| 7,597,500 B2 * | 10/2009 | Gernez | 403/403 |

OTHER PUBLICATIONS

ZIP Machine Table "T" Slot Bolts (inch) [online] [retrieved on Jul. 9, 2008] retrieved from website: http://zipbolts.thomasnet.com/viewitems/all-categories/zip-machine-table-t-slot-bolts-inch-?&forward=1.

Woodworking Joints [online] Jul. 2, 2008 [retrieved on Jul. 9, 2008] retrieved from website: http://en.wikipedia.org/wiki/Woodworking_joint.

* cited by examiner

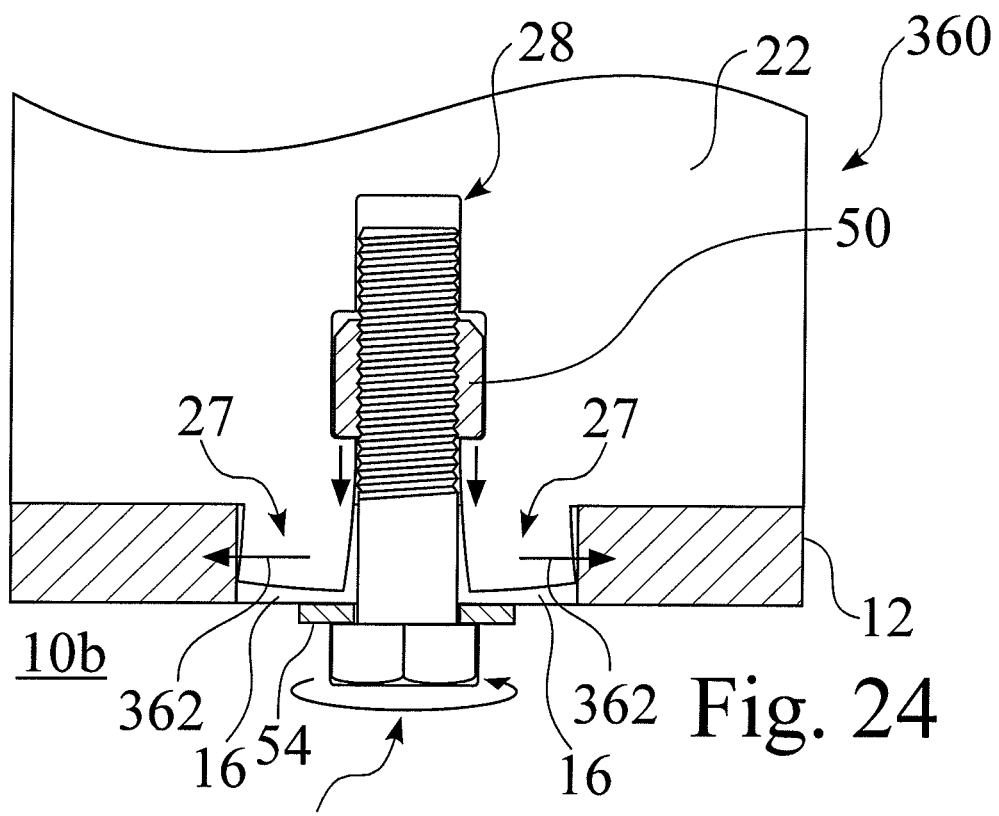
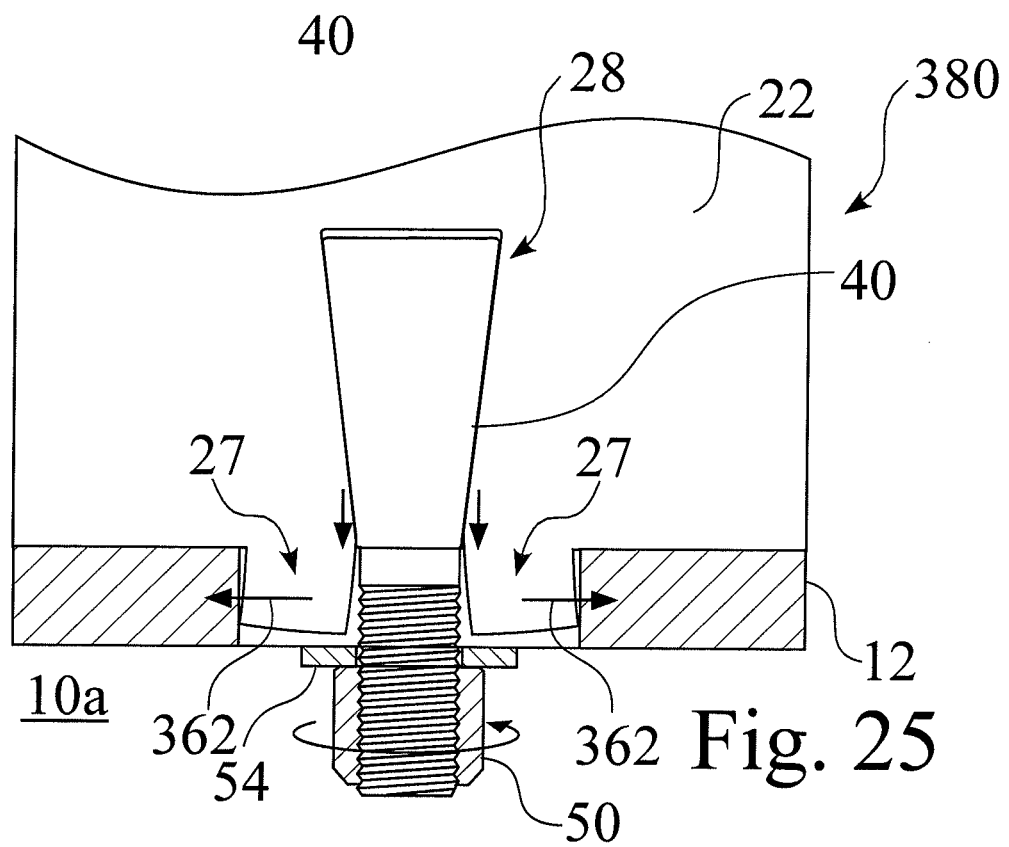

CAPTIVE BOLT MECHANISM AND PROCESS FOR STRUCTURAL ASSEMBLY OF PLANAR COMPONENTS

FIELD OF THE INVENTION

The present invention relates generally to the field of fastener systems. More particularly, the present invention relates to mechanical fastener systems, structures, and processes.

BACKGROUND OF THE INVENTION

Structural assemblies often include a wide variety of complex joints, brackets and fastener structures, such as to hold and/or affix components in relation to one another. The necessary manufacturing methods required to produce the main structural members are often complex, due to the design of the attachment method used.

As well, the type and number of fasteners required for a structural design are often restrictive, making the overall assembly overly complex, expensive to produce, difficult to assemble, and difficult or impossible to disassemble and/or service.

The manufacture of components for a structural assembly is greatly simplified if the individual components are essentially planar in design. If each component generally comprises a planar shape having a uniform thickness, each component may be manufactured using rapid and relatively simple processes such as stamping and/or torch, laser, or water cutting.

Conventional structural assemblies may comprise planar elements that interlock to form joints between the elements. Typically, to impart additional rigidity to the structure, these joints incorporate a mortise and tenon or tongue and groove mechanism. Attaining sufficient structural rigidity, however, typically requires exacting manufacturing tolerances and/or substantial material deformation upon assembly. The former increases manufacturing costs, and the second greatly limits the choice of suitable materials.

Other prior structures have addressed such issues with shimmed tenons, keyed tenons, and camming hooks. While these mechanisms do provide additional rigidity, they complicate the assembly process. Moreover, depending on the material used, repeated assembly and disassembly may result in permanent material deformation and a reduction in joint rigidity.

Other prior designs have incorporated threaded fasteners. This greatly reduces the above-described simplification of manufacturing, in that the use of threaded fasteners typically necessitates secondary machining, such as the boring of in-plane holes or the tapping of holes created in the primary manufacturing processes.

It would be advantageous to provide a structure, system and process for joining substantially planar construction elements in a manner that is easily assembled, highly rigid, and easily disassembled. Such a development would provide a significant technical advance.

As well, it would be advantageous to provide a structure, system and process for joining construction elements that allows repeated assembly and disassembly without loss of rigidity. Such a development would provide a further technical advance.

Furthermore, it would be advantageous to provide a structure, system and process for joining construction elements that does not necessitate secondary machining beyond that achievable by typical planar manufacturing processes. Such a development would provide an additional technical advance.

SUMMARY OF THE INVENTION

A captive bolt mechanism joins planar structural members. In an exemplary embodiment, a first structural member has an opening defined there through. The head of a bolt is captured in a fastener region of a fastener slot, e.g. a T-shaped slot, within a second member, such that the threaded shaft of the bolt protrudes, in-plane, beyond the end of the second member. The threaded shaft is then passed through the opening in the first member and secured with a nut. As the nut is tightened, the underside of the bolt head is drawn against the interior surface of the fastener slot, binding the end of the second member against the surface of the first member. In an alternate embodiment, a nut is similarly confined within the fastener region of the fastener slot, and a bolt or screw is extended through the hole in the first member and the slot in the second member, and then fastened to the nut.

BRIEF DESCRIPTION OF THE DRAWINGS

FIG. 24 shows a schematic side view of an exemplary captive fastener mechanism, wherein tightening of the fasteners with respect to each other provides a flaring out of a tenon within a mortise region;

FIG. 25 is a schematic view of an alternate exemplary captive fastener mechanism having a tapered slot and tapered fastener slidably positioned therein, wherein tightening of the fasteners with respect to each other provides a flaring out of a tenon within a mortise region;

DETAILED DESCRIPTION OF PREFERRED EMBODIMENTS

Figure 1:
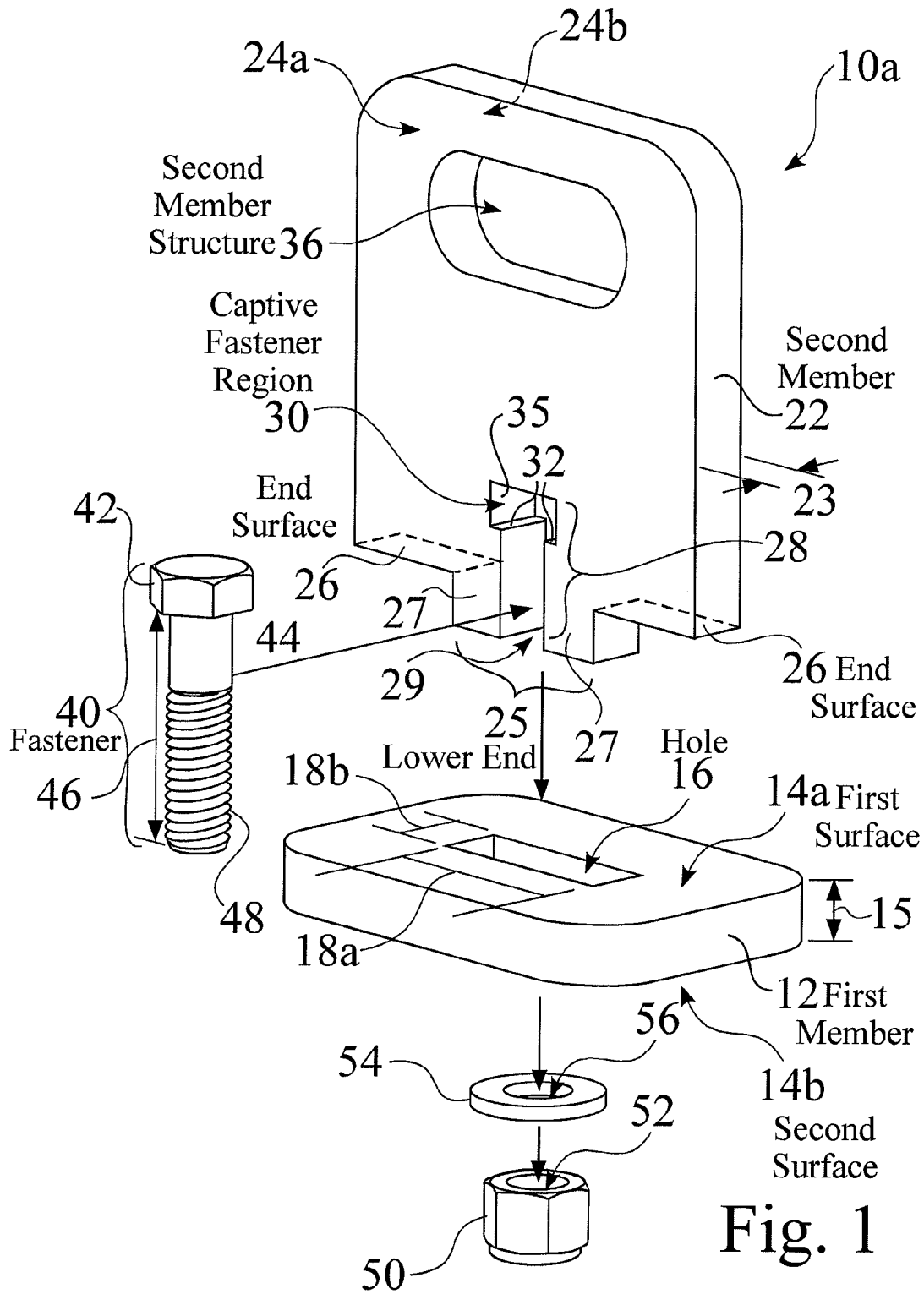
FIG. 1 is an expanded assembly view of a first embodiment of a captive fastener mechanism for joining planar members.
Figure 2:
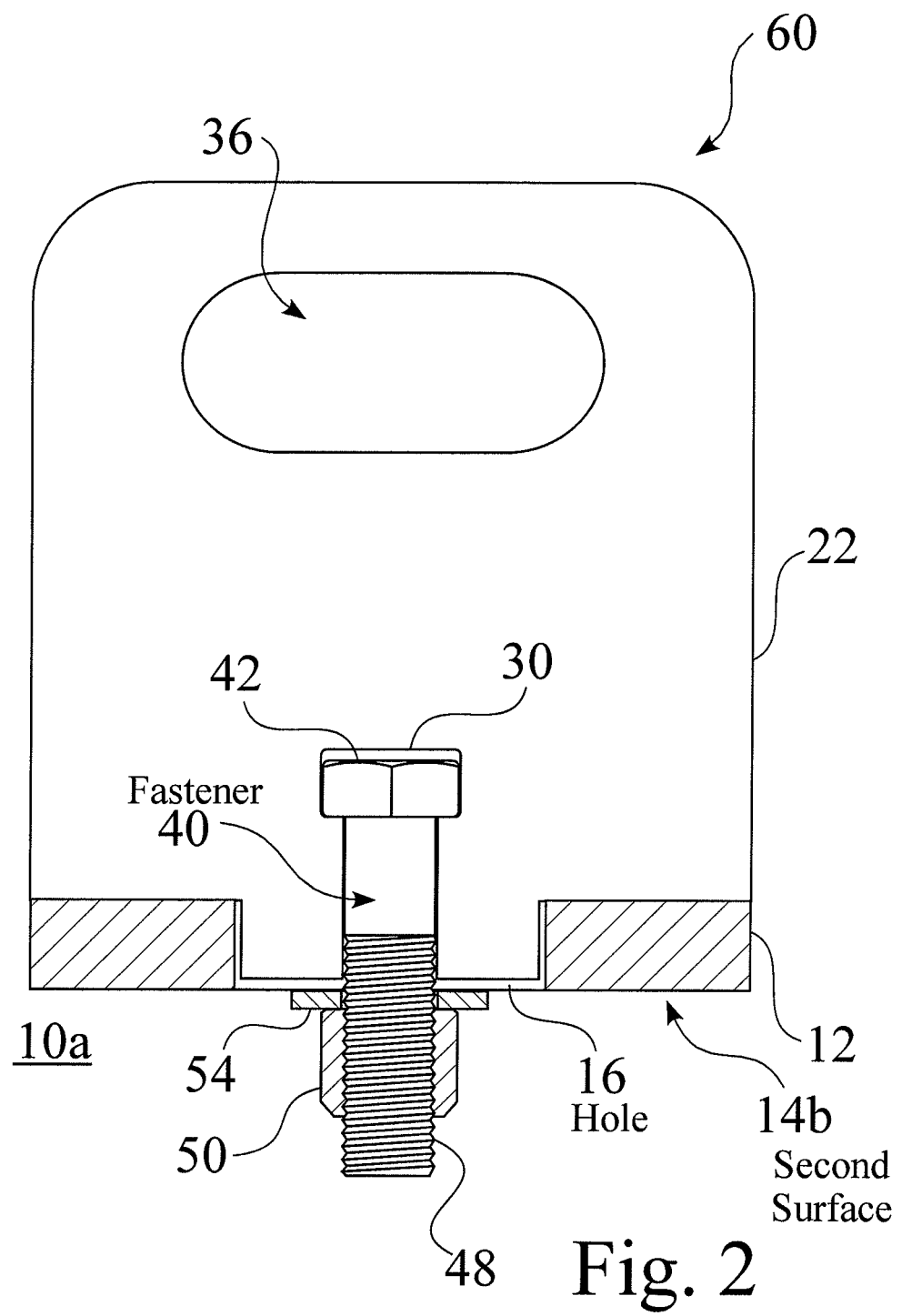
FIG. 2 is a partial cutaway view of a first embodiment of a captive fastener mechanism for joining planar members.
Figure 3:
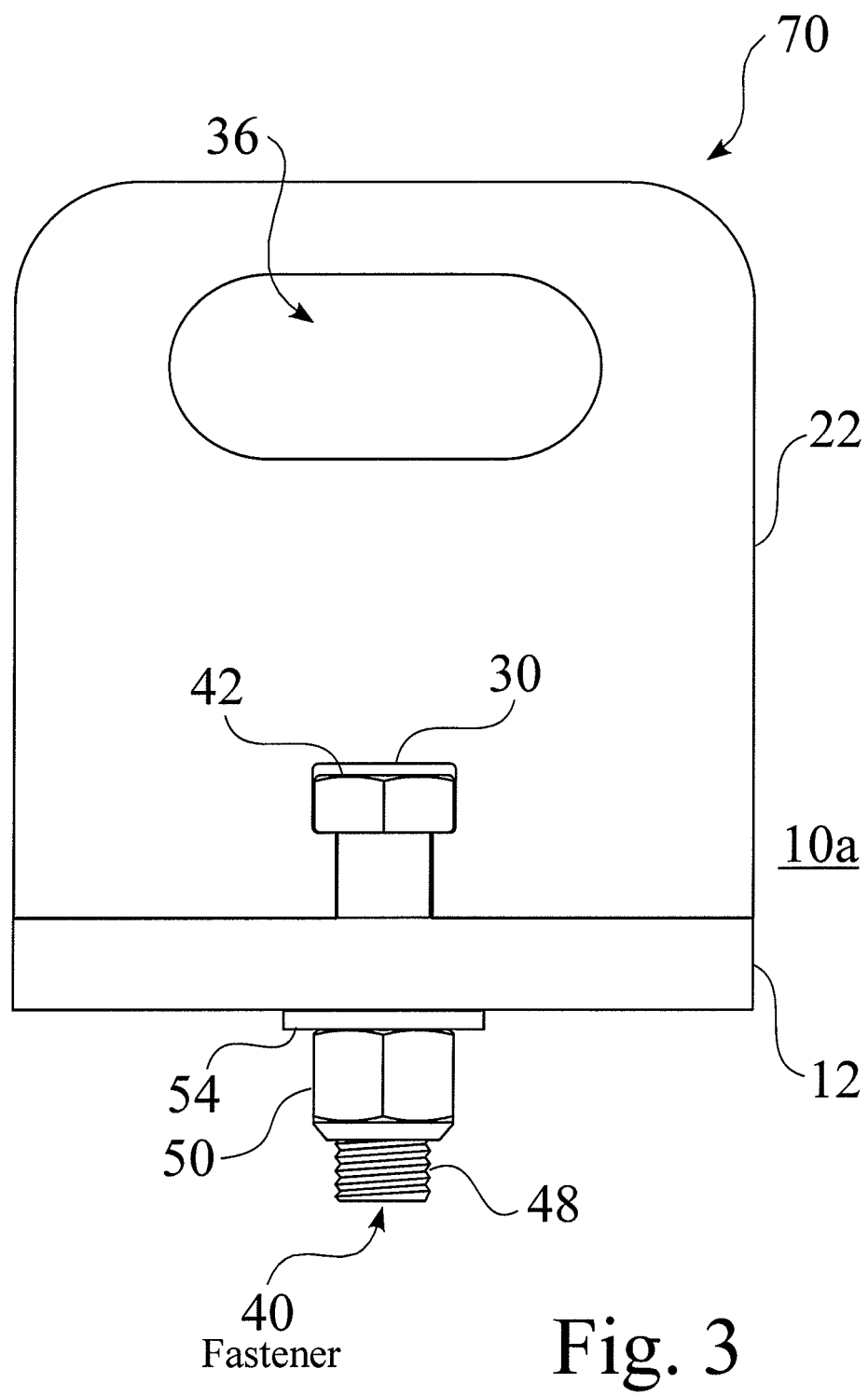
FIG. 3 is a side view of a first embodiment of a captive fastener mechanism for joining planar members.
Figure 4:
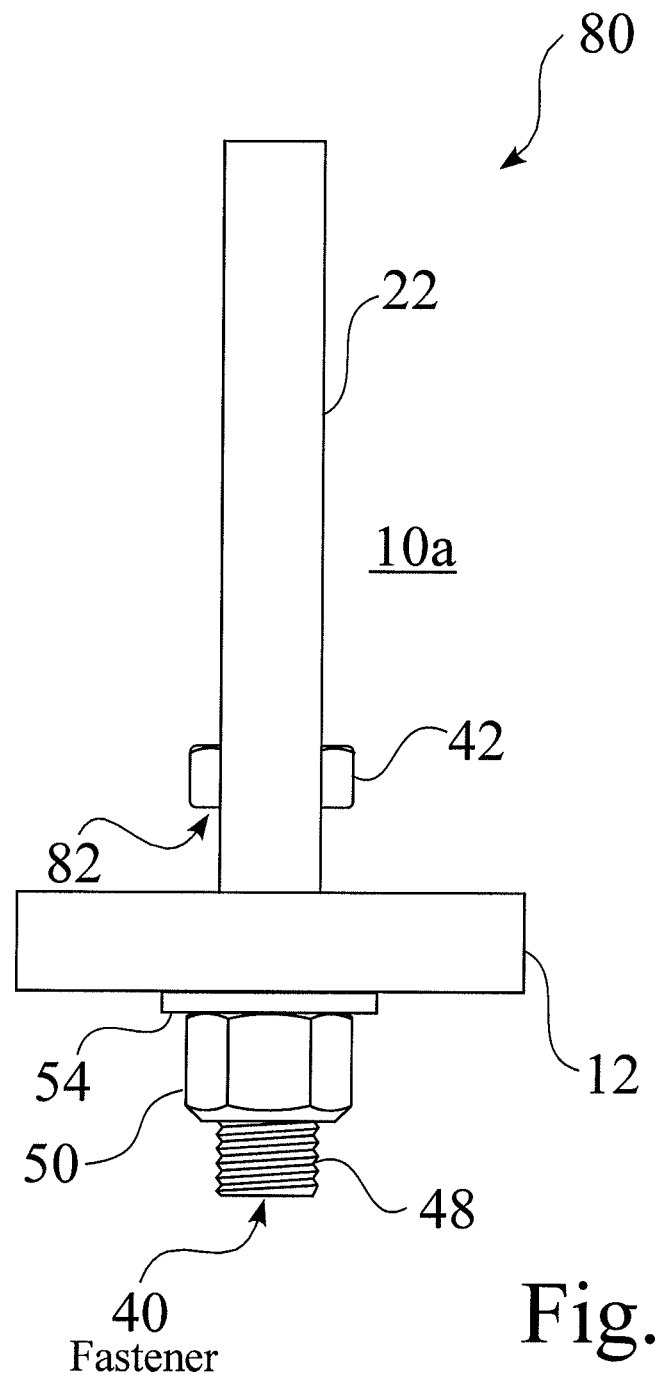
FIG. 4 is an end view of a first embodiment of a captive fastener mechanism for joining planar-members.
Figure 5:
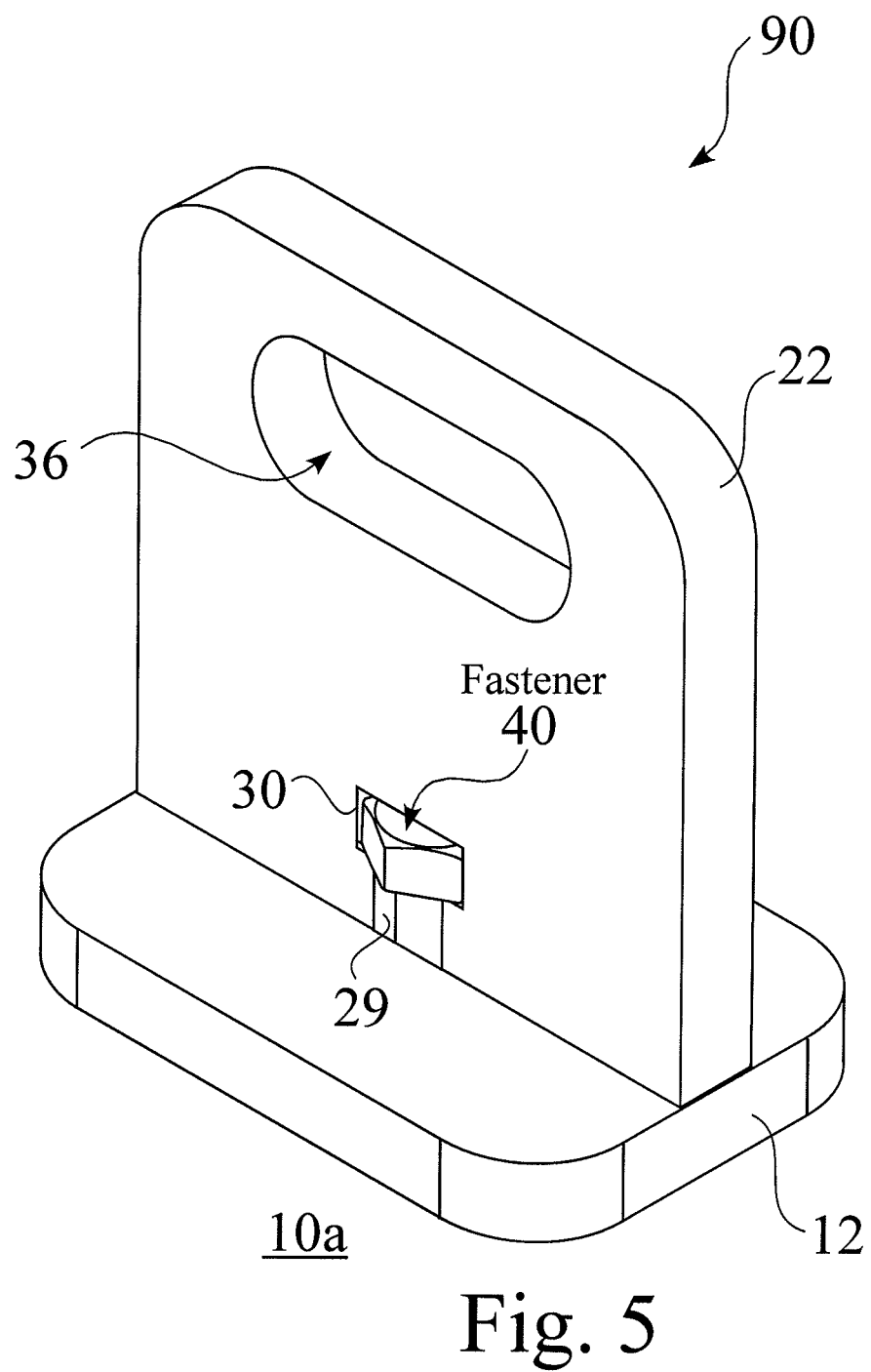
FIG. 5 is an upper perspective view of a first embodiment of a captive fastener mechanism for joining planar members.
Figure 6:
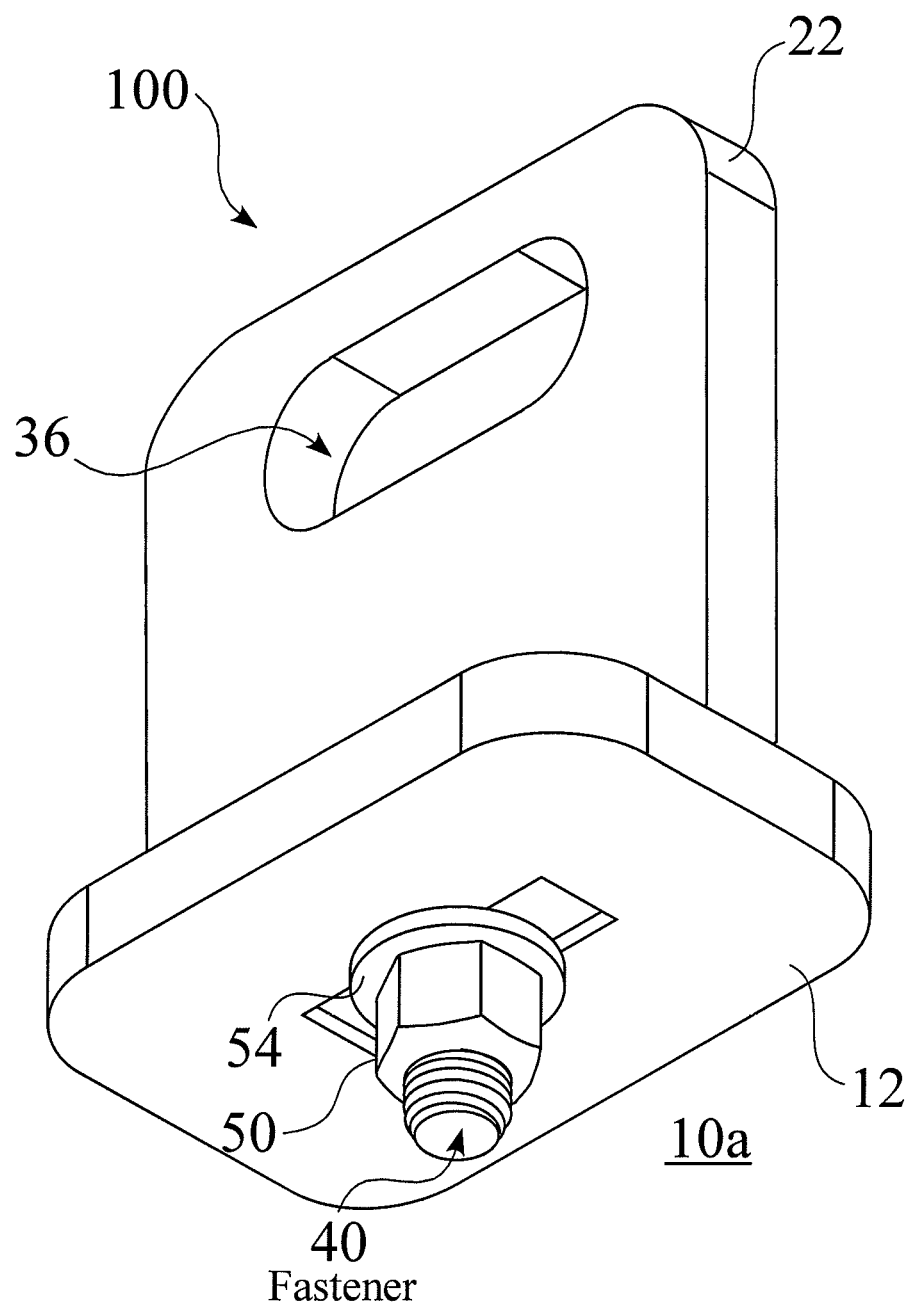
FIG. 6 is a lower perspective view of a first embodiment of a captive fastener mechanism for joining planar members.

FIG. 1 is an expanded assembly view of a first exemplary embodiment of a captive fastener mechanism 10, e.g. 10a for joining structural members, such as planar members 12, 22. FIG. 2 is a partial cutaway view 60 of a first embodiment of a captive fastener mechanism 10a for joining planar components 12, 22. FIG. 3 is a side view 70 of a first embodiment of a captive fastener mechanism 10a for joining planar components 12, 22. FIG. 4 is an end view 80 of a first embodiment of a captive fastener mechanism for joining planar components 12, 22. FIG. 5 is an upper perspective view of a first embodiment of a captive; fastener mechanism 10a for joining planar components 12, 22. FIG. 6 is a lower perspective view 100 of a first embodiment of a captive fastener mechanism 10a for joining planar components 12,22.

As seen in FIG. 1, the first planar member 12 comprises a first surface 14a, and a second surface 14b opposite the first surface 14a. As well, the first member 12 further comprises a hole 16 defined between the first surface 14a and the second surface 14b. In the exemplary structure 10a shown in FIG. 1, the hole 16 comprises a rectangular slot 16, comprising a mortise having a length 18a and a width 18b. The exemplary planar member 12 seen in FIG. 1 has a thickness 15.

The second planar member 22 shown in FIG. 1 has a thickness 23, and comprises a first surface 24a, and a second surface 24b opposite the first surface 24a. A planar end surface 26 is generally defined at one end 25, e.g. a lower end 25, of the second planar member 22, extending between the first surface 24a, and the second surface 24b.

As well, the exemplary second planar member 22 shown in FIG. 1 further comprises a tenon region 27 at the lower end 25 that extends away from the end surface 26, wherein the tenon 27 is insertable into the hole 16 when the second member 22 and the first member are positioned together, e.g. such that the end surface 26 contacts the first surface 14a of the first member 12.

The second planar member 22 shown in FIG. 1 also comprises a fastener slot 28, typically comprising a longitudinal, e.g. vertical, slot 29 defined between the first surface 24a, and the second surface 24b, that extends upward from the lower end 25. A captive fastener region 30 is defined upwardly in the longitudinal slot 29 from the lower end 25, and extends outwardly to define fastener retaining surfaces 32 that may preferably be generally coplanar to the end surface 26 of the second member 22.

The exemplary longitudinal slot 29 and captive fastener region 30 seen in FIG. 1 together define a tee-shaped fastener slot 28, i.e. a T-slot, by which a first fastener, e.g. a bolt 40, may be positioned and extend downwardly beyond the lower end 25, such that the fastener 40 is fastenably engageable with a second fastener, e.g. a nut 50. The fastener assembly 40,50 may further comprise a washer 54.

Figure 14:
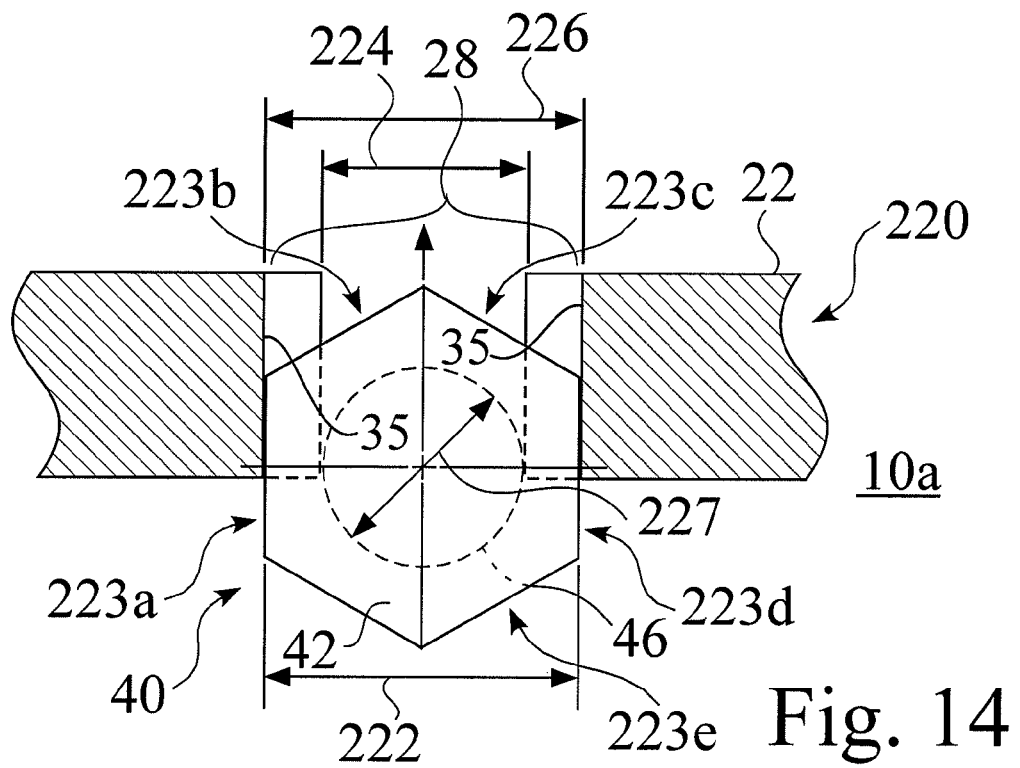
FIG. 14 is a detailed cutaway view of an exemplary captive fastener mechanism, wherein a fastener is slidably positionable within a fastener slot in a second planar member, and wherein opposing faces of the fastener are rotatably constrained by opposing sides of the upper region of the fastener slot.

The opposing sides 35 of the captive fastener region 30 may preferably be spaced such that the head 42 of the bolt 40 is prevented from rotating when located within the captive fastener region 30. For example, for a bolt 40 having a polygonal head 42 with an even number of sides, e.g. a six-sided, i.e. hex head, the head 42 of the bolt 40 has a designated size, e.g. 32 mm, that may be based on the distance 222 (FIG. 14) between opposing faces 223, e.g. 223a,223d (FIG. 14). For such a bolt 40, the spacing 226 between the opposing sides 35 may be sized to slidably accept the bolt 40, while preventing the head 42 from excessive rotation during tightening 510 (FIG. 29) of the nut 50.

In the first exemplary embodiment 10a, the head 42 of the bolt 40 is captured in a captive fastener region 30 of the T-shaped fastener slot 28 within the second member 22, such that the threaded shaft 46 of the bolt 40 protrudes, in-plane, beyond the lower end 25 of the second member 22. The threaded shaft 46 is then passed through the hole 16 in the first member 12 and secured with a nut 50. As the nut 50 is tightened 510 (FIG. 29), the underside 82 (FIG. 4) of the bolt head 42 is drawn against the interior surface 32 of the captive fastener region 30, binding the lower end surface 26 of the second member 22 against the first surface 14*a* of the first member 12.

While the exemplary shapes, sizes, and configurations of the first member 12 and the second member 22 are schematically shown in FIG. 1 as generally rectangular, the first member 12 and the second member 22 may comprise a wide variety of shapes, sizes, and configurations, and may also be configured in non-orthogonal arrangements. As well, the first member 12 and the second member 22 may comprise all or a portion of other assemblies. In some current embodiments 10, e.g. 10*a*,10*b*, the first members 12 and the second members 22 comprise water cut aluminum plate.

Figure 7:
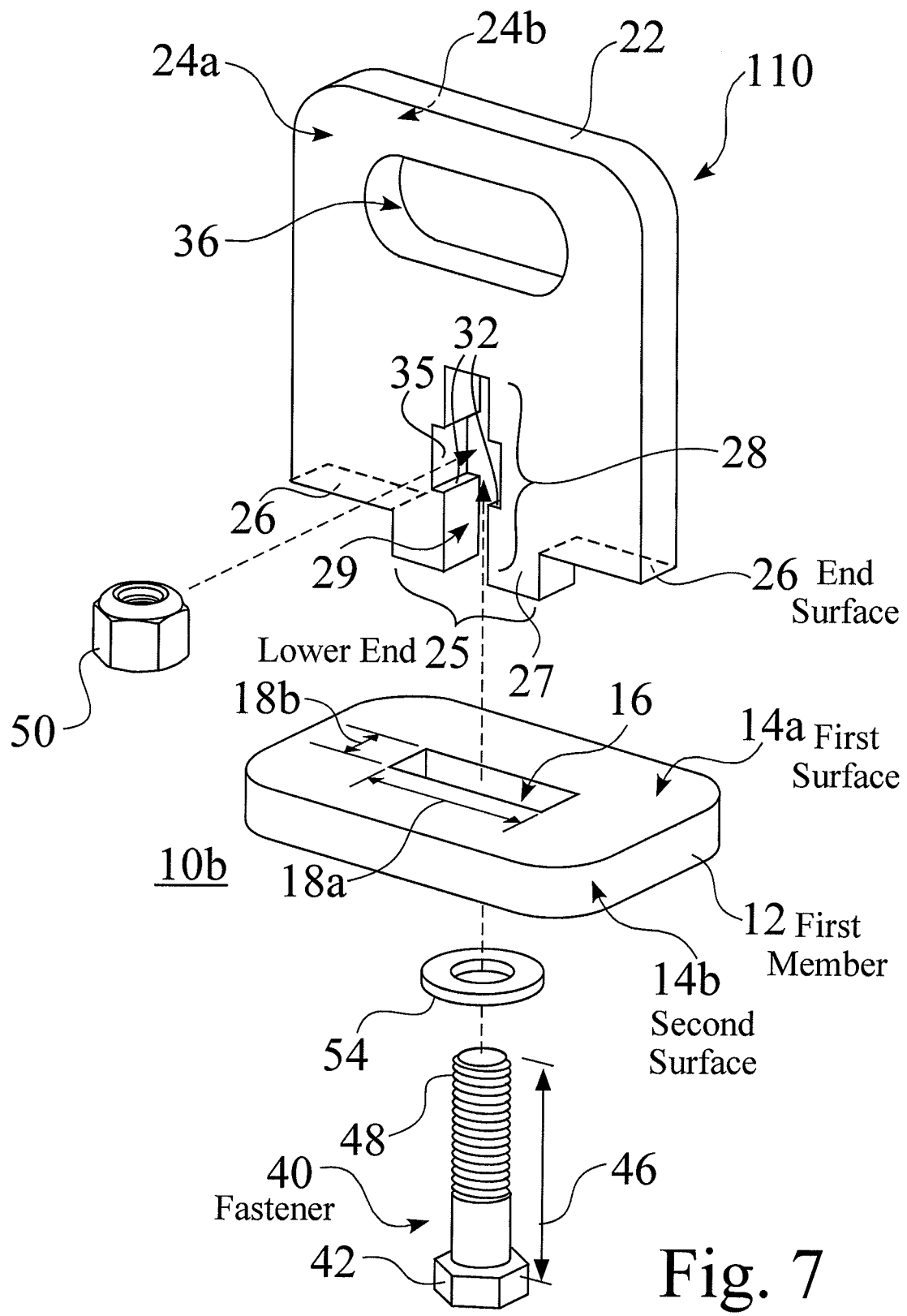
FIG. 7 is an expanded assembly view of a second embodiment of a captive fastener mechanism for joining planar members.
Figure 8:
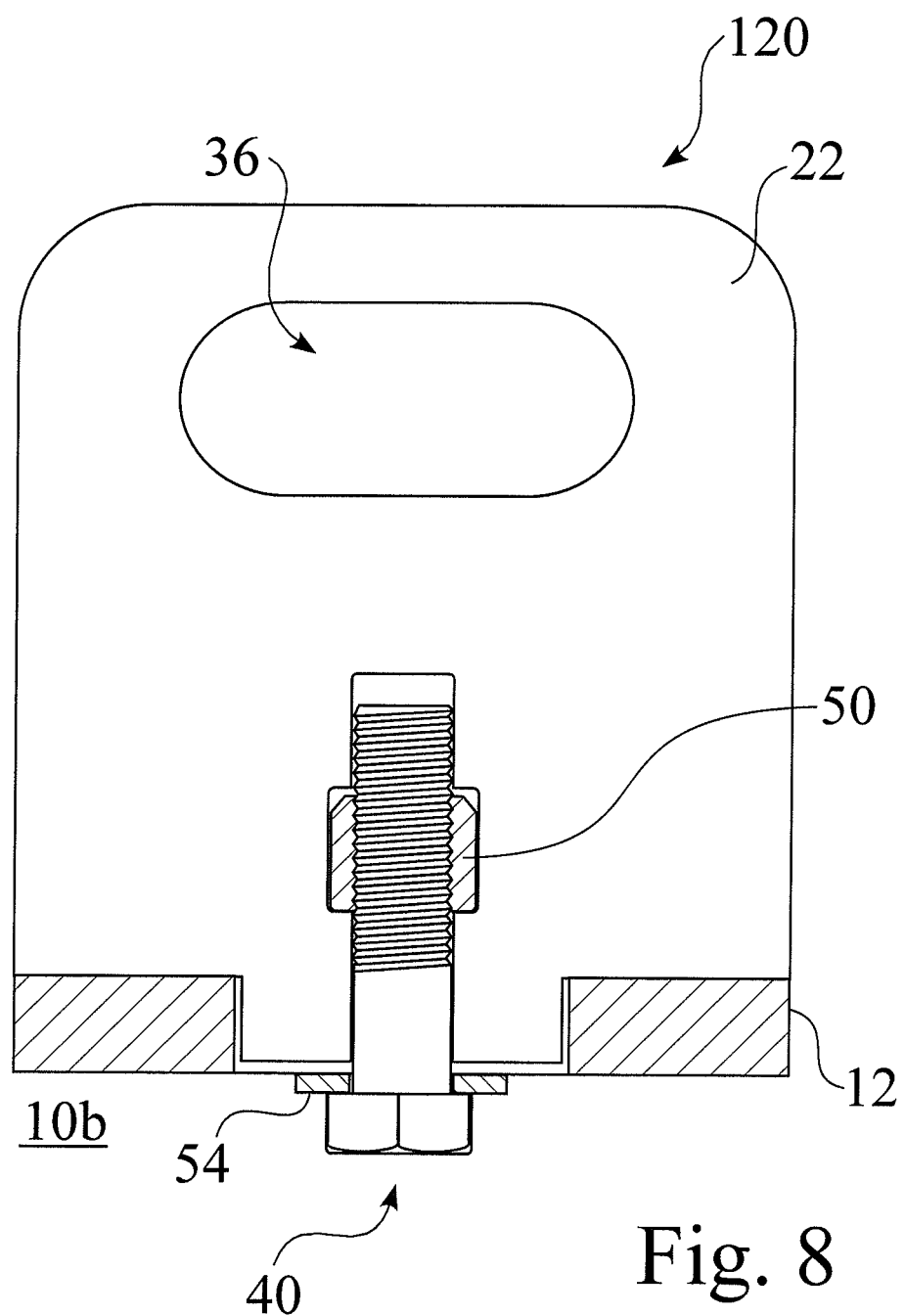
FIG. 8 is a partial cutaway view of a second embodiment of a captive fastener mechanism for joining planar members.
Figure 9:
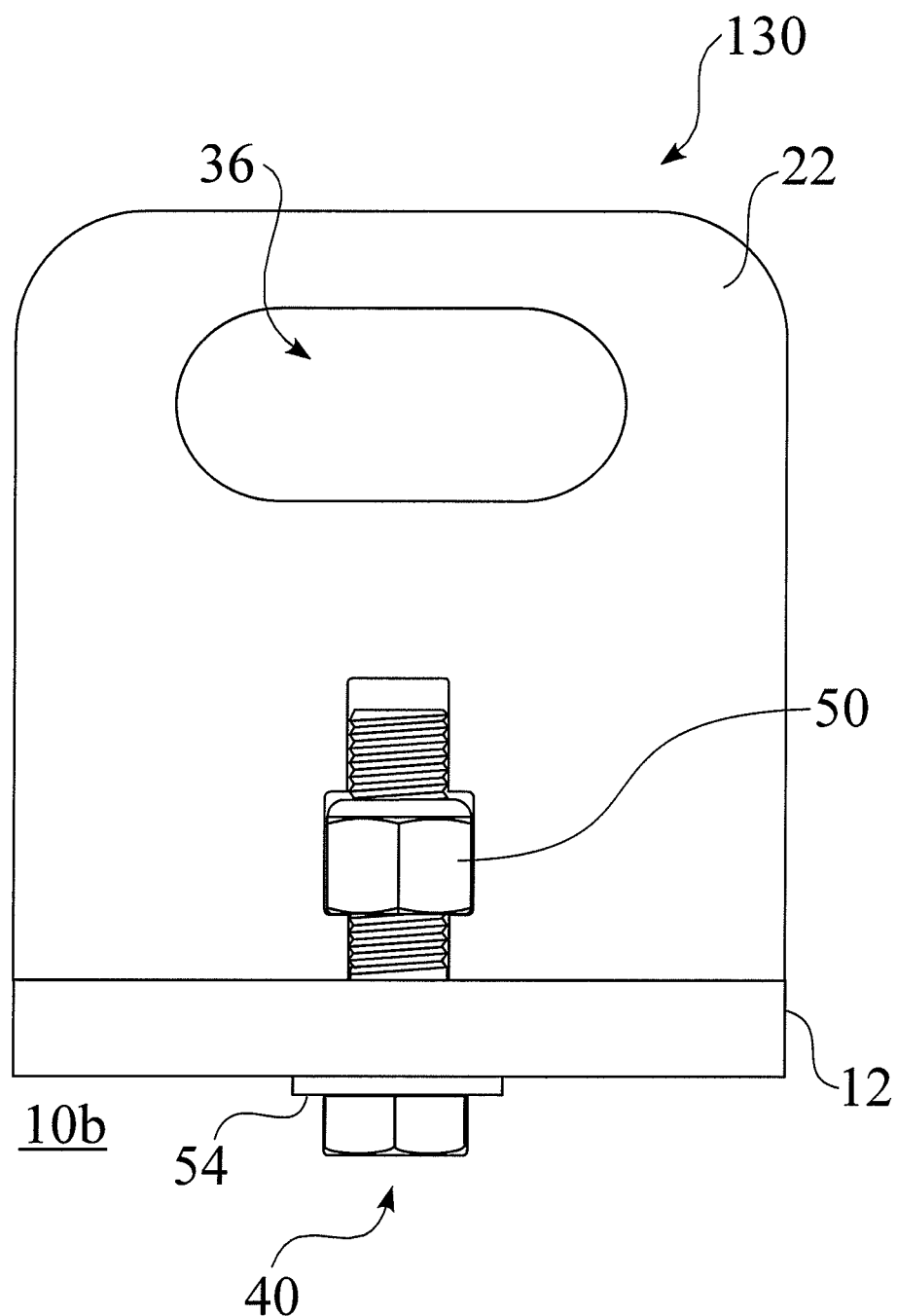
FIG. 9 is a side view of a second embodiment of a captive fastener mechanism for joining planar members.
Figure 10:
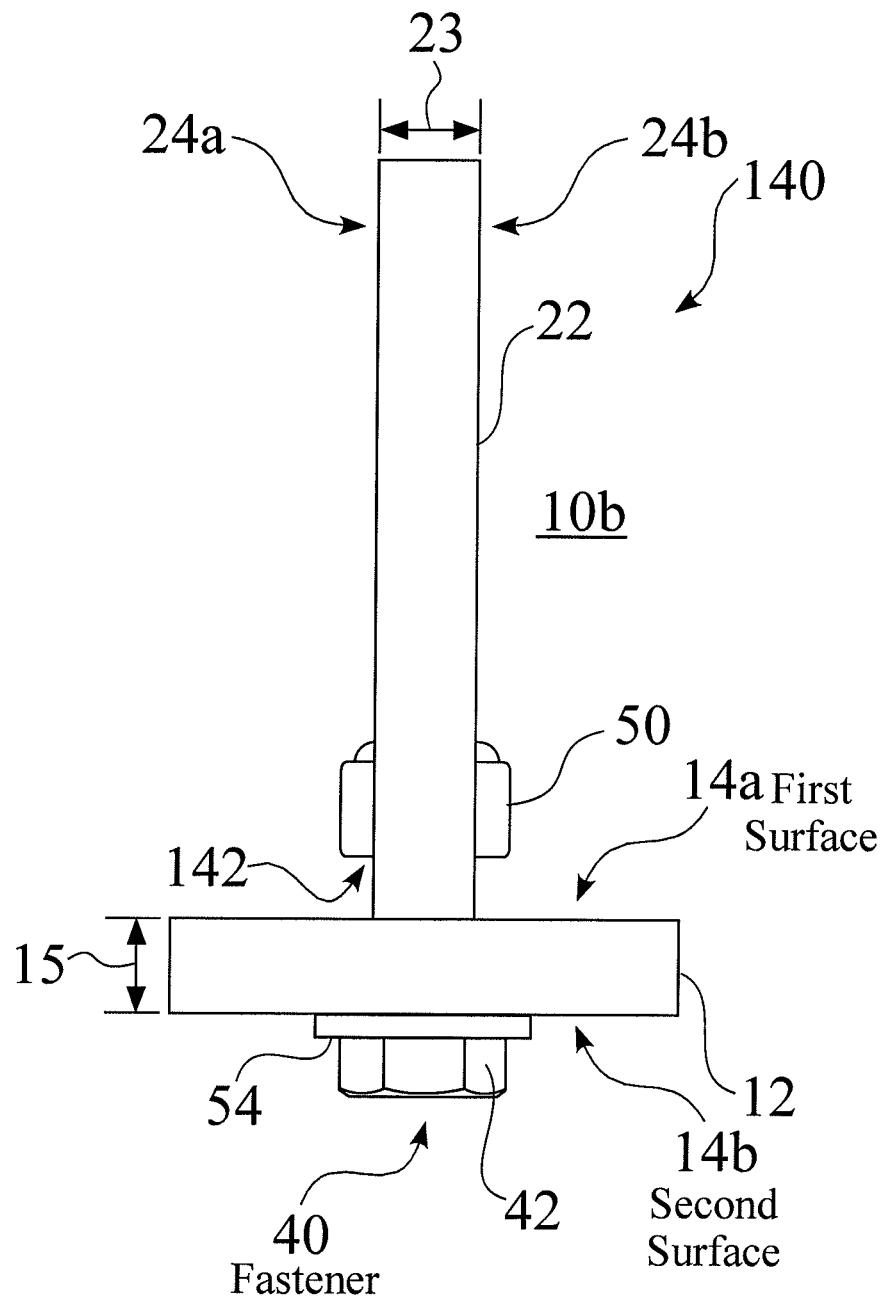
FIG. 10 is an end view of a second embodiment of a captive fastener mechanism for joining planar members.
Figure 11:
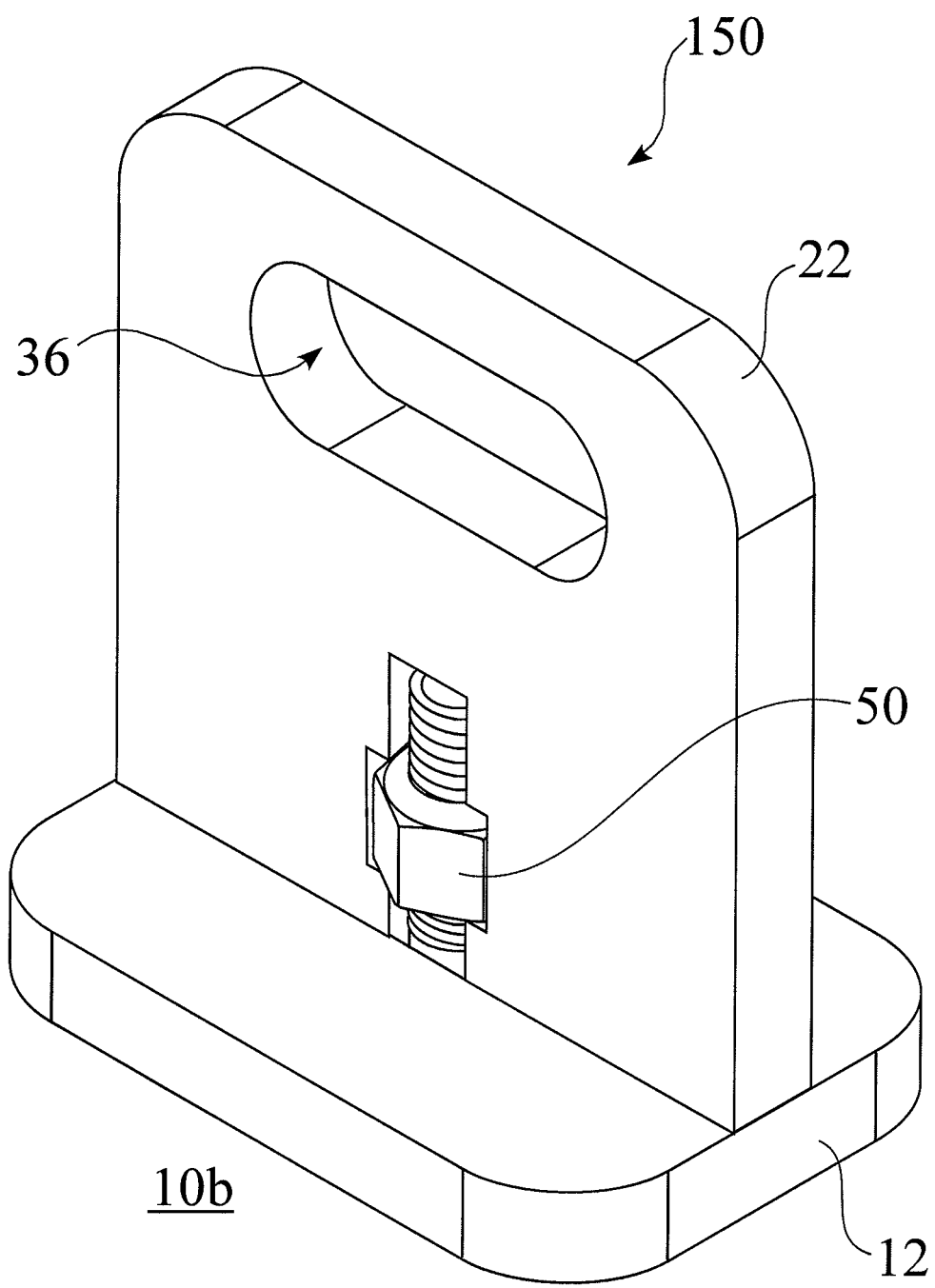
FIG. 11 is an upper perspective view of a second embodiment of a captive fastener mechanism for joining planar members.
Figure 12:
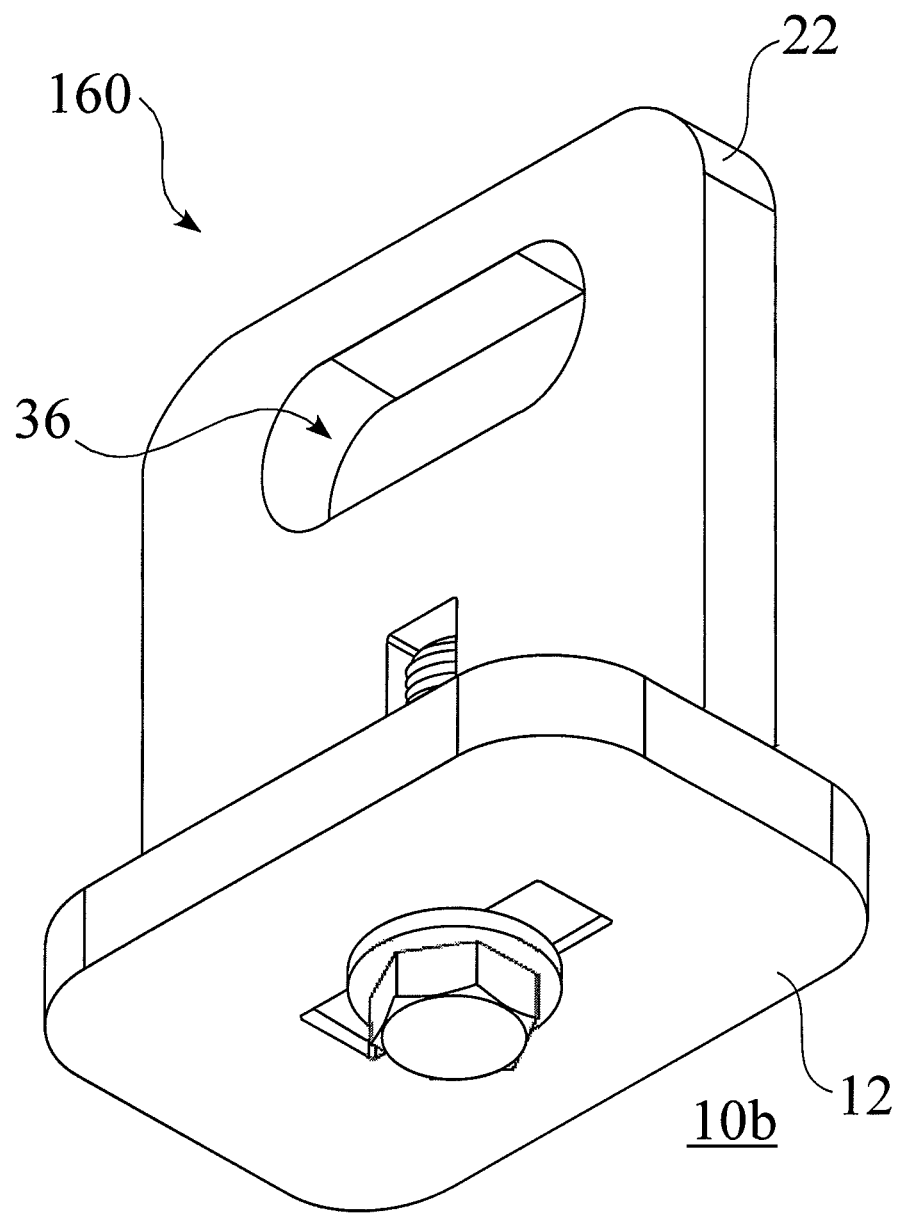
FIG. 12 is a lower perspective view of a second embodiment of a captive fastener mechanism for joining planar members.

FIG. 7 is an expanded assembly view 110 of a second embodiment of a captive fastener mechanism 10*b* for joining planar members 12, 22. FIG. 8 is a partial cutaway view of a second embodiment of a captive fastener mechanism 10*b* for joining planar members 12, 22. FIG. 9 is a side view of a second embodiment of a captive fastener mechanism 10*b* for joining planar members 12, 22. FIG. 10 is an end view of a second embodiment of a captive fastener mechanism 10*b* for joining planar members 12, 22. FIG. 11 is an upper perspective view of a second embodiment of a captive fastener mechanism 10*b* for joining planar members 12, 22. FIG. 12 is a lower perspective view of a second embodiment of a captive fastener mechanism 10*b* for joining planar members 12, 22.

In contrast to the first embodiment of a captive fastener mechanism 10*a* for joining planar members 12, 22, the position of the bolt 40 and nut 50 are exchanged in the second embodiment of a captive fastener mechanism 10*b*, wherein the nut 50 is slidably positioned and captured within the captive fastener region 30 of the fastener slot 28 in the second member 22, and wherein a corresponding bolt 40 is installed through the hole 16 of the first member 12 and the fastener slot 28 of the second member 22, to be fastened 530 (FIG. 30) to the captured nut 50.

As seen in FIG. 7, the first planar member 12 similarly comprises a first surface 14*a*, and a second surface 14*b* opposite the first surface 14*a*. As well, the first member 12 further comprises a hole 16 defined between the first surface 14*a* and the second surface 14*b*. In the exemplary structure 10*b* shown in FIG. 7, the hole 16 comprises a rectangular slot 16, comprising a mortise having a length 18*a* and a width 18*b*. The exemplary planar member 12 seen in FIG. 7 has a thickness 15 (FIG. 10).

The second planar member 22 shown in FIG. 7 has a thickness 23 (FIG. 10), and comprises a first surface 24*a*, and a second surface 24*b* opposite the first surface 24*a*. A planar end surface 26 is generally defined at one end 25, e.g. a lower end 25, of the second planar member 22, extending between the first surface 24*a*, and the second surface 24*b*.

As well, the exemplary second planar member 22 shown in FIG. 7 similarly comprises a tenon region 27 at the lower end 25 that extends away from the end surface 26, wherein the tenon 27 is extendable into the hole 16 when the second member 22 and the first member 12 are positioned together 528 (FIG. 30), e.g. such that the end surface 26 contacts the first surface 14*a* of the first member 12.

The second planar member 22 shown in FIG. 7 also comprises a fastener slot 28, typically comprising a longitudinal, e.g. vertical, slot 29 defined between the first surface 24*a*, and the second surface 24*b*, that extends upward from the lower end 25. A captive fastener region 30 is defined upwardly in the longitudinal slot 29 from the lower end 25, and extends outwardly to define fastener retaining surfaces 32 that may preferably be generally coplanar to the end surface 26 of the second member 22.

The exemplary longitudinal slot 29 and captive fastener region 30 seen in FIG. 7 together define a T-shaped or cross-shaped fastener slot 28, by which a first fastener, e.g. a nut 50 may be positioned, through which a second fastener 40, a bolt, screw, or stud 40, is fastenably engageable with the first fastener, e.g. a nut 50, from the second surface 14*b* of the first member 12 and extending through, e.g. upward, through the longitudinal slot 29. As seen in FIG. 7, the fastener assembly 40,50 may similarly further comprise a washer 54.

Figure 15:
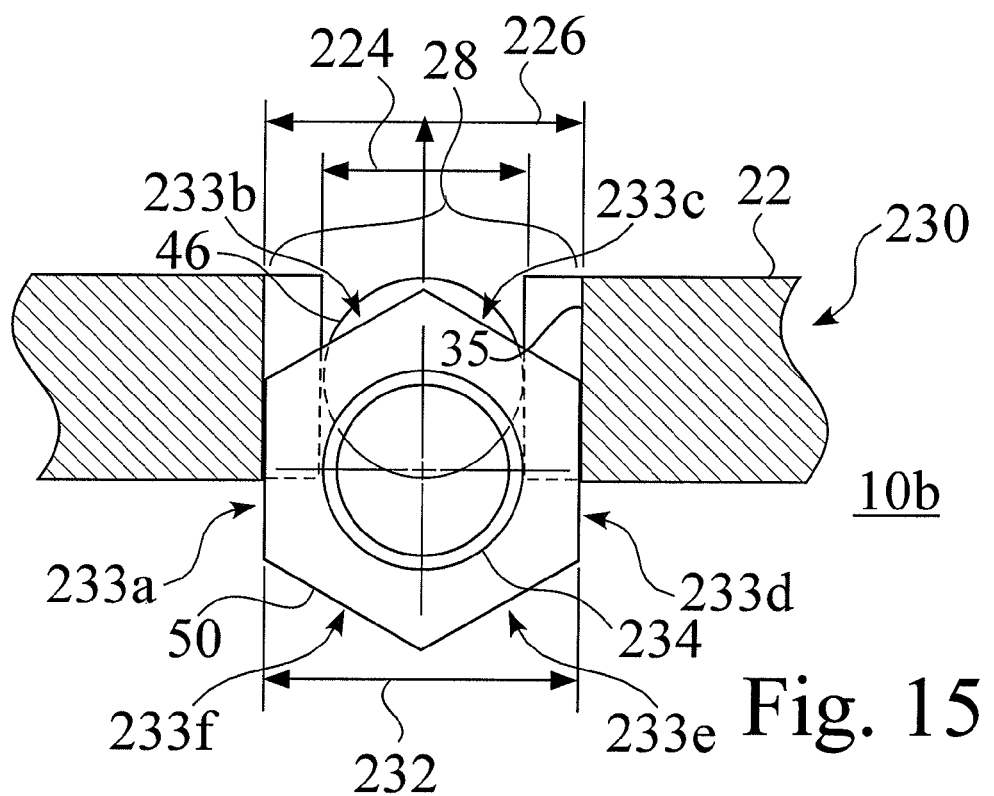
FIG. 15 is a detailed cutaway view of an exemplary captive fastener mechanism, wherein a nut is slidably positionable within a fastener slot in a second planar member, and wherein opposing faces of the nut are rotatably constrained by opposing sides of the upper region of the fastener slot.

In the second structural embodiment 10*b*, the opposing sides 35 of the captive fastener region 30 may preferably be spaced such that the nut 50 is prevented from rotating when located within the captive fastener region 30. For example, for a nut 50 having a polygonal head with an even number of sides, e.g. a six-sided, i.e. hex head, the nut 50 has a designated size, e.g. 32 mm, that may be based on the distance 232 (FIG. 15) between opposing faces 233, e.g. 233*a*,233*d* (FIG. 15). For such a nut 50, the spacing 226 between the opposing sides 35 may be sized to slidably accept the nut 50, while preventing the nut 50 from excessive rotation during tightening of the bolt 40 and nut 50.

In the second exemplary embodiment 10*b*, a nut 50 is captured, i.e. confined within a fastener slot 28 within the second member 22, and a bolt or screw 40 is extended through the hole 16 in the first member 12 and the longitudinal slot 29 in the second member 22, and then is fastened 530 (FIG. 30) to the captive nut 50. As the bolt or screw 40 is tightened 530, the underside 142 (FIG. 10) of the nut 50 is drawn against the interior surface 32 of the captive fastener region 30, binding the lower surface 26 of the second member 22 against the first surface 14*a* of the first member 12.

Additional material may be removed from the second member 22, e.g. above the captive fastener region 30 of the T-slot 28, such as to provide clearance for the threaded end 48 of the shaft 46 of the bolt 40 as it passes through the nut 50.

Figure 13:
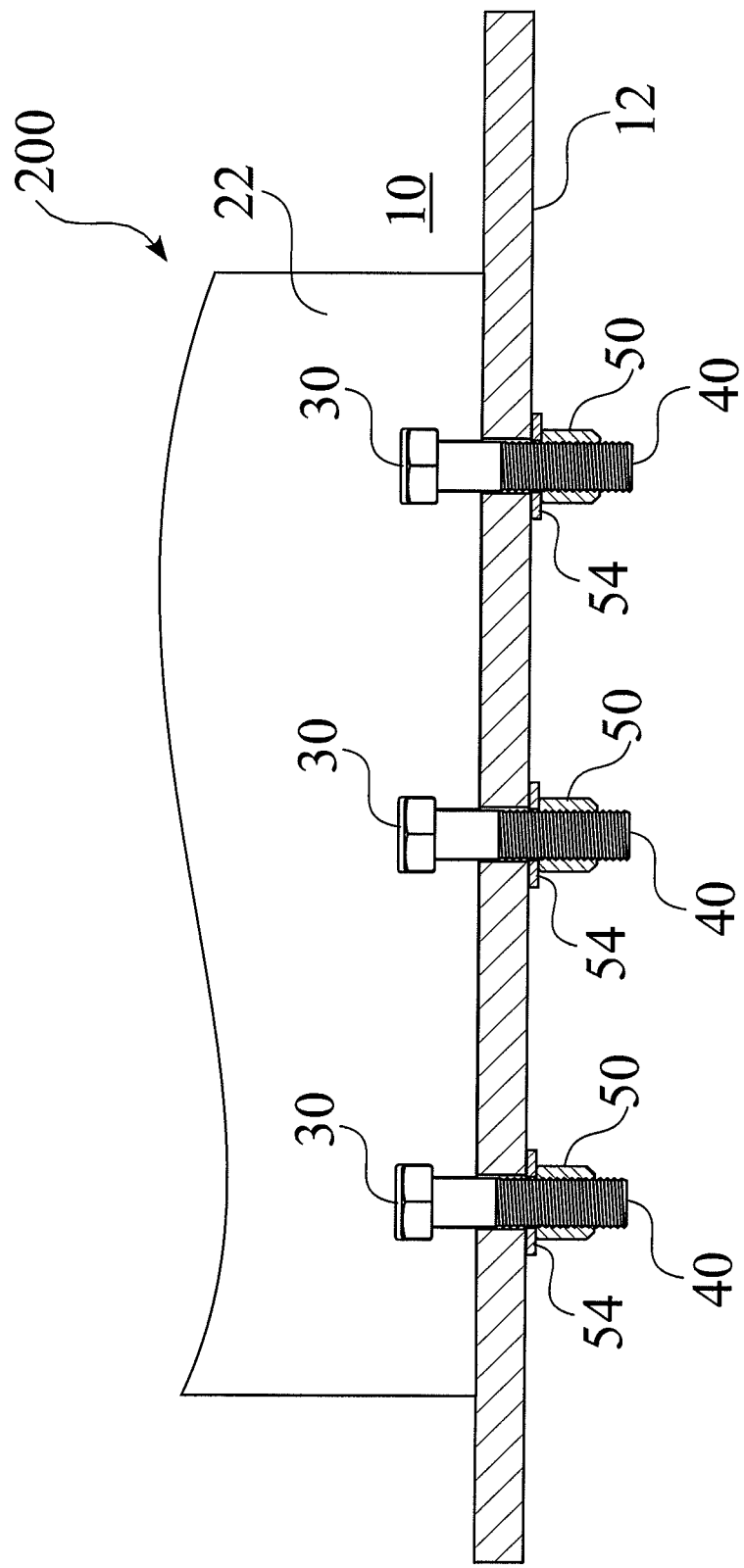
FIG. 13 is a partial cutaway view of an alternate embodiment of a captive fastener mechanism for joining planar members, having one or more attachment mechanisms between planar members.

FIG. 13 is a partial cutaway view 200 of an alternate embodiment of a captive fastener mechanism 10, e.g. 10*c*, for joining planar members 12, 22, having one or more attachment mechanisms between planar members 12, 22. The exemplary second member 22 seen in FIG. 13 comprises a simplified lower end 25 that does not extend into the holes 16, in contrast to structures 10 that may preferably include one or more mortises 16 and corresponding tenons 27, such as seen in FIGS. 1-12.

While the exemplary captive fastener mechanism 10*c* shown in FIG. 13 shows a similar structure to the first embodiment 10*a*, wherein one or more bolts 40 are captured in the second member 22, connected to nuts 50 located on the opposite surface 14*b* of the first member 12, it should be appreciated that the structure 10*c* may be similar to the second embodiment 10*b*, wherein one or more nuts 50 are captured in the second member 22, connected to bolts 40 located on the opposite surface 14*b* of the first member 12 and extending through the holes 16 and slots 28 to be fastened to corresponding nuts 50. In another alternate embodiment 10, the fastener may comprise two nuts 50 with a threaded stud connected there between.

The captive fastener mechanism 10 can suitably be used for a wide variety of structures, such as but not limited to commercial applications, residential applications, industrial applications, civil engineering structures, marine applications, military applications, and/or aerospace applications. While a structure comprising one or more captive fastener mechanisms 10 may be used for simple structures, such as but not limited to brackets, hitches, and/or handles, more complex structures may readily be at least partially constructed using one or more captive fastener mechanisms 10, such as but not limited to chairs, sofas, shelving, struts, stairs, rails, platforms, and/or shelters.

FIG. 14 is a detailed cutaway view 220 of an exemplary captive fastener mechanism 10a, wherein a fastener 40 is located within a fastener slot 28 in a second planar member 22, and wherein opposing faces 223, e.g. 223a,223d, of the fastener are rotatably constrained by opposing sides 35 of the upper captive fastener region 30 of the fastener slot 28. As seen in FIG. 14, the head 42 of the fastener 40 may preferably be polygonal in shape, with an even number of sides 223, e.g. a hex-bolt having six sides 223a-223f.

Figure 29:
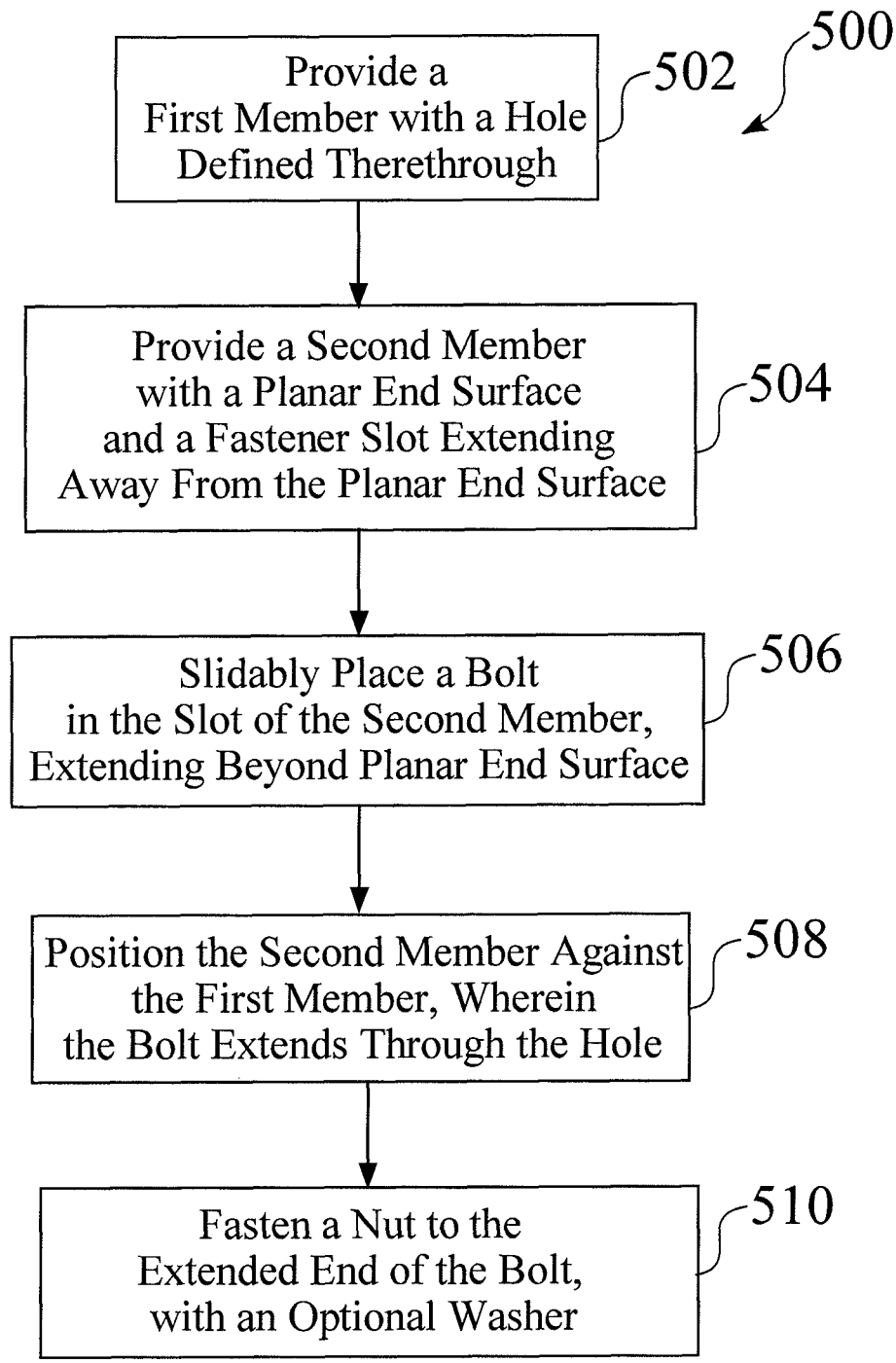
FIG. 29 is a flowchart for an exemplary assembly process for a first embodiment of an exemplary captive fastener mechanism, wherein the captive fastener comprises a bolt.

The width 226 of the captive fastener region 30 of the fastener slot 28 for the captive fastener mechanism 10, e.g. 10a, may preferably be defined or formed, e.g. machined or cut, such as to match the dimension 222 of the bolt head 42, to secure the bolt 40 against rotation during the tightening process 510 (FIG. 29). As well, the width 224 of the longitudinal slot 29 is typically formed to be greater than or equal to the diameter 227 of the shaft 46 of the bolt 40.

Alternatively, additional material may be removed from the second member 22, such as above the captive fastener region 30 of the fastener slot, 28, to allow insertion of an L-shaped wrench 242 (FIG. 18), e.g. an Allen wrench 242 (FIG. 18) or a socket 242 (FIG. 16) during the tightening process 510 (FIG. 29).

If the tolerances of the planar manufacturing process are sufficiently accurate, the width 226 of the captive fastener region 30 of the fastener slot 28 can be formed to provide a press-fit for the bolt head 42. This prevents inadvertent ejection of bolts 40 from the fastener slot 28, as the members 12,22 are manipulated 508 (FIG. 29) during the assembly process 500 (FIG. 29).

FIG. 15 is a detailed cutaway view 230 of an exemplary captive fastener mechanism 10, wherein a nut 50 is located within a fastener slot 28 in a second planar member 22, and wherein opposing faces 233a,233d of the nut 50 are rotatably constrained by opposing sides 35 of the captive fastener region 30 of the fastener slot 28. As seen in FIG. 15, the head of the nut 50 may preferably be polygonal in shape, with an even number of sides 233, e.g. a hex-nut having six sides 233a-233f.

Figure 30:
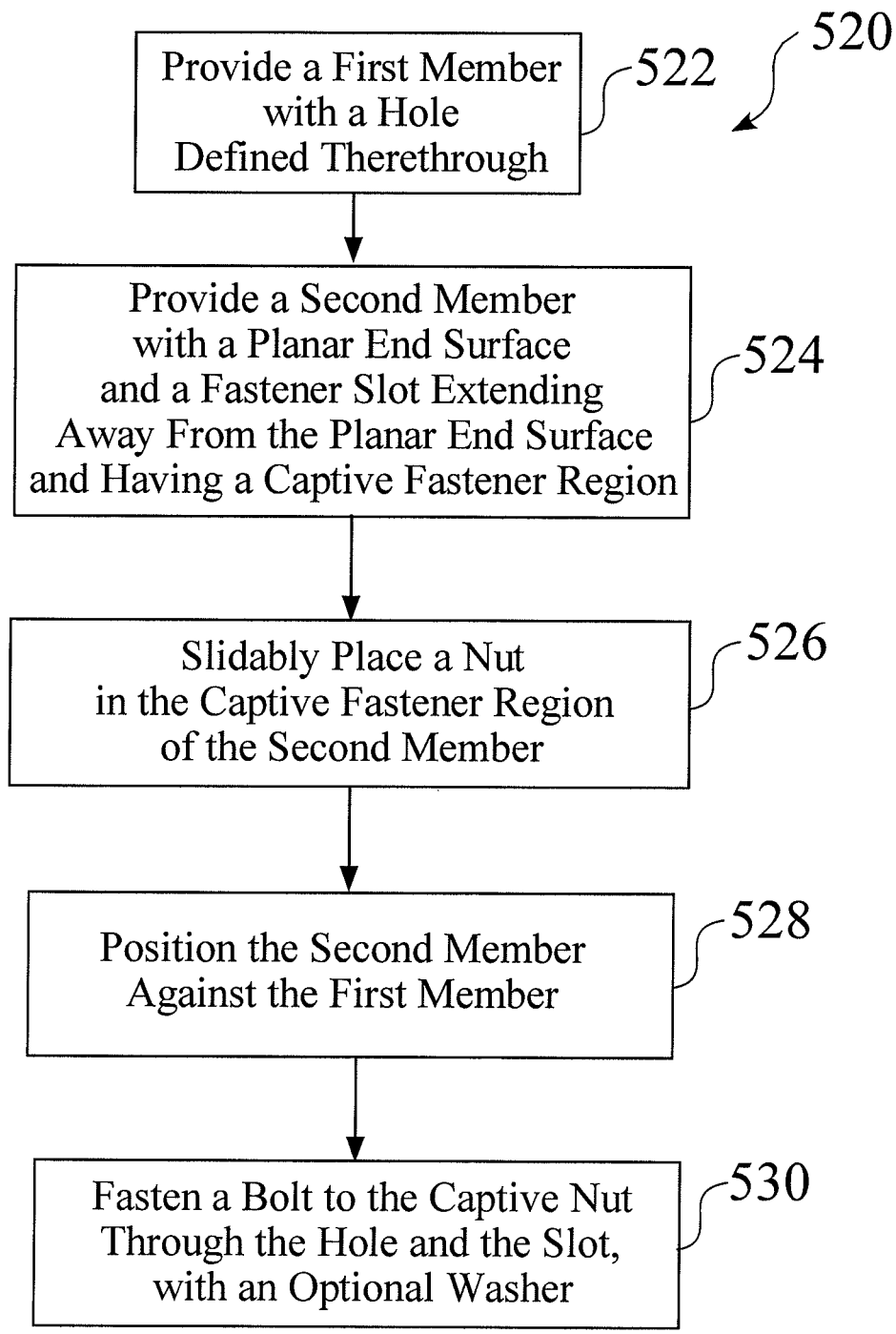
FIG. 30 is a flowchart for an exemplary assembly process for a second embodiment of an exemplary captive fastener mechanism, wherein the captive fastener comprises a nut.

The width 226 of the captive fastener region 30 of the fastener slot 30 for the second exemplary embodiment of the captive fastener mechanism 10b may preferably be defined or formed, e.g. machined or cut, such as to match the dimension, i.e. width 232 of the nut 50, to secure the nut 50 against rotation during the tightening process 530 (FIG. 30). Furthermore, the width 224 of the longitudinal slot 29 is typically formed to be greater than or equal to the diameter of the shaft 46 of the fastener 40, such that the fastener 40 may readily be inserted through the longitudinal slot 29 for attachment to the nut 50, or retracted through the longitudinal slot 29 for disassembly.

Alternatively, additional material may be removed from the second member 22, such as above the fastener region 30 of the fastener slot 28, to allow insertion of a wrench 242 (FIG. 18) or a socket 242 (FIG. 16) during the tightening process 530 (FIG. 30).

If the tolerances of the planar manufacturing process are sufficiently accurate, the width of the captive fastener region of the fastener slot 28 can be formed to provide a press-fit for the nut 40. This prevents inadvertent ejection of nuts 50 from the fastener slots 28, as the members are manipulated 528 during the assembly process 520 (FIG. 30).

The dimension of the head 42 of the bolt 40 may preferably be less than the thickness 23 of the second member 22, such that the edges of the head 42 do not protrude beyond the planar surfaces 24a,24b of the second member 22 after assembly. If the mechanism 10 is combined with a mortise 16 and tenon 27, and the fastener region 30 of the fastener slot 28 is within the tenon protrusion 27, this allows for full insertion of tenon 27 into the mortise 16.

Alternatively, the mortise 16 in the first member 12 may be cut or otherwise formed with a clearance opening to pass the bolt head 42. Similarly, if the mechanism 10a is combined with a mortise 16 and tenon 27, the diameter of the shaft 46 of the bolt 40 may preferably be less than the thickness 23 of the second member 22. If not, a clearance opening can be cut within the mortise 16 as needed.

Figure 16:
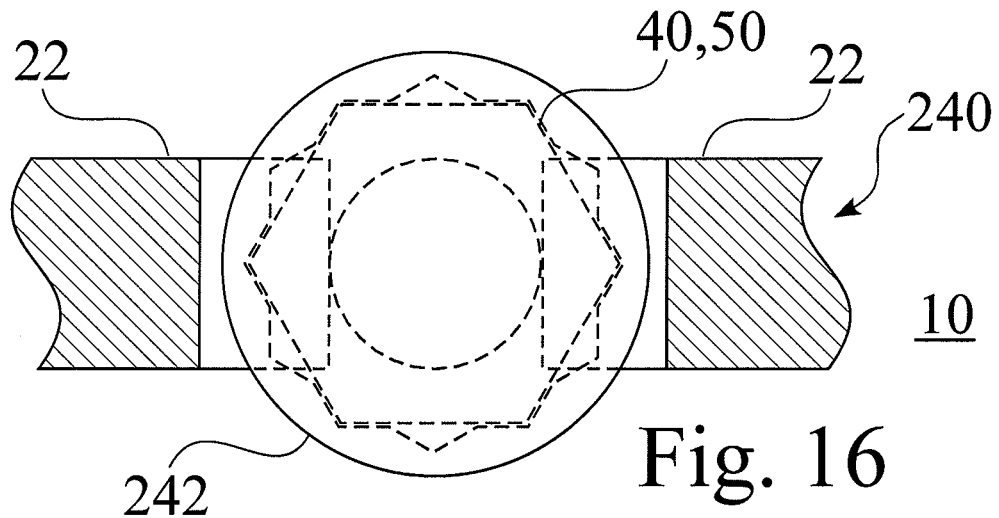
FIG. 16 is a detailed top cutaway view of an exemplary captive fastener mechanism, wherein a fastener is located within a fastener slot in a second planar member, and wherein the fastener slot provides access for a tool to engage the periphery of the fastener.
Figure 17:
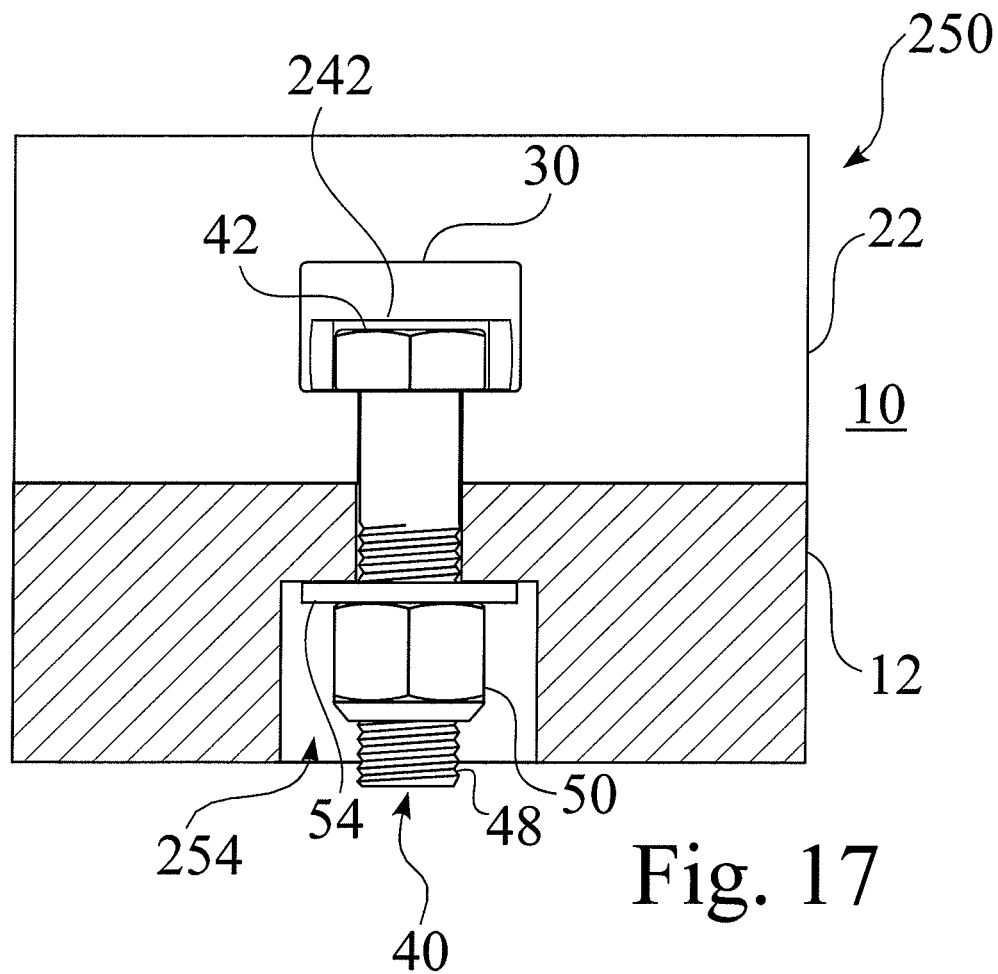
FIG. 17 is a side cutaway view of an exemplary captive fastener mechanism, wherein a fastener is located within a fastener slot in a second planar member, and wherein the fastener slot provides access for a tool to engage the periphery of the fastener.

FIG. 16 is a detailed cutaway view 240 of an exemplary captive fastener mechanism 10, wherein a fastener 40, 50 is located within a fastener slot 28 in a second planar member 22, and wherein the fastener region 30 provides access for a tool 242, e.g. a wrench or socket 242, to engage the periphery of the fastener 40,50. FIG. 17 is a side cutaway view 250 of an exemplary captive fastener mechanism 10, wherein a fastener, e.g. a bolt 40 or nut 50, such as shown in FIG. 15, is located within the fastener region 30 of a fastener slot 28 in a second planar member 22, and wherein the fastener region 30 of the fastener slot 28 provides access for a tool 242 to engage the periphery of the fastener 40, 50. As also seen in FIG. 17, the first member 12 may further comprise a recessed region 254 wherein at least a portion of the bolt 40, nut 50, and/or washer 54 may be located. The recessed area 254 may additionally be shaped to restrict rotation of a bolt 40 or nut 50, or may provide suitable access for a tool 242, e.g. a wrench or socket 242.

Figure 18:
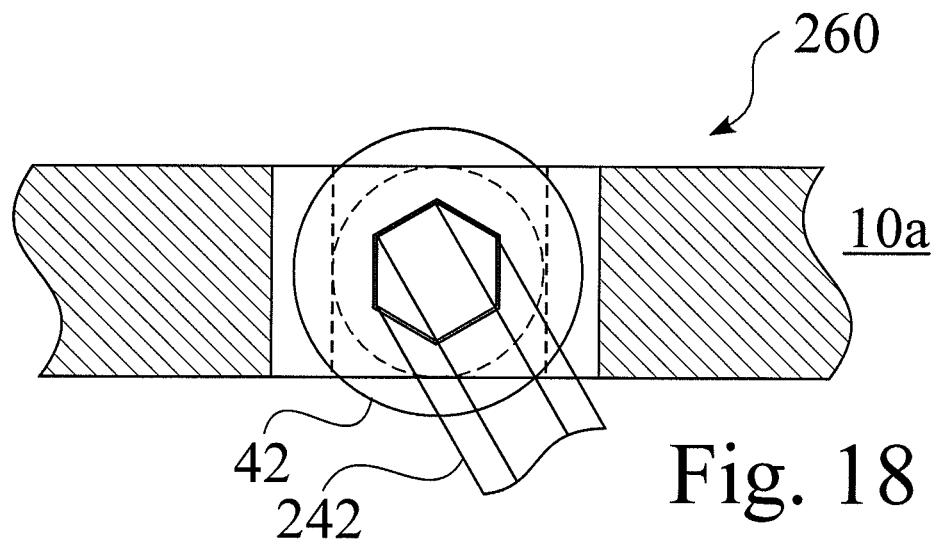
FIG. 18 is a detailed top cutaway view of an exemplary captive fastener mechanism, wherein a fastener is located within a fastener slot in a second planar member, and wherein the fastener slot provides access above the fastener for a tool to engage the top end of the fastener.
Figure 19:
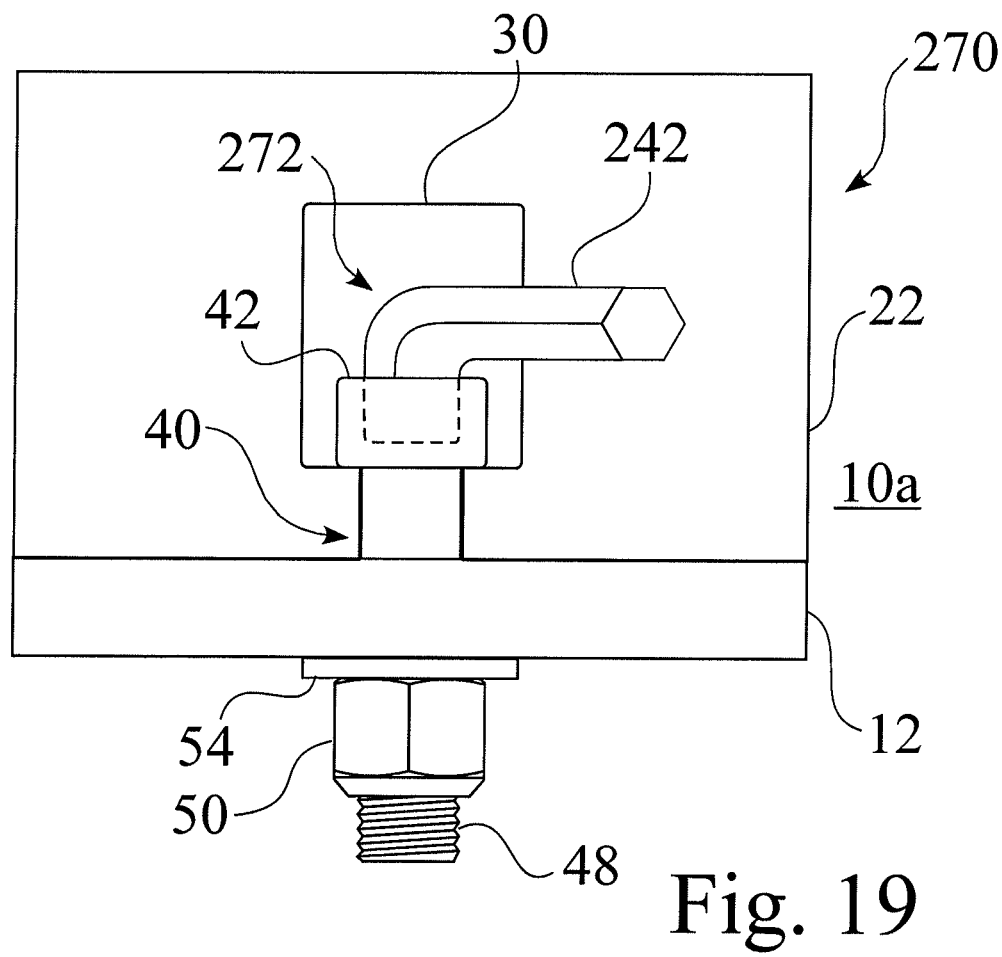
FIG. 19 is a side cutaway view of an exemplary captive fastener mechanism, wherein a fastener is located within a fastener slot in a second planar member, and wherein the fastener slot provides access above the fastener for a tool to engage the top end of the fastener.

FIG. 18 is a detailed cutaway view 260 of an exemplary captive fastener mechanism 10, wherein a wherein a fastener, e.g. a bolt 40, is located within the fastener region 30 of a fastener slot 28 in a second planar member 22, and wherein the fastener region 30 provides access 272 (FIG. 19) above the fastener 40 for a tool 242, e.g. a wrench or socket 242, to engage the top end of the fastener 40. FIG. 19 is a side cutaway view 270 of an exemplary captive bolt mechanism 10, wherein a fastener, e.g. a bolt 40, is located within the fastener region 30 of a fastener slot 28 in a second planar member 22, and wherein the fastener region 30 provides access 272 above the fastener 40 for a tool 242, such as but not limited to an L-shaped wrench 242, e.g. an Allen wrench 242, to engage the top end of the fastener 40.

While the captive bolt mechanism 10 is readily used in structures wherein structural members are joined in an orthogonal fashion, alternate embodiments of the captive bolt mechanism 10 may provide non-orthogonal junctions between structural members 12, 22.

Figure 20:
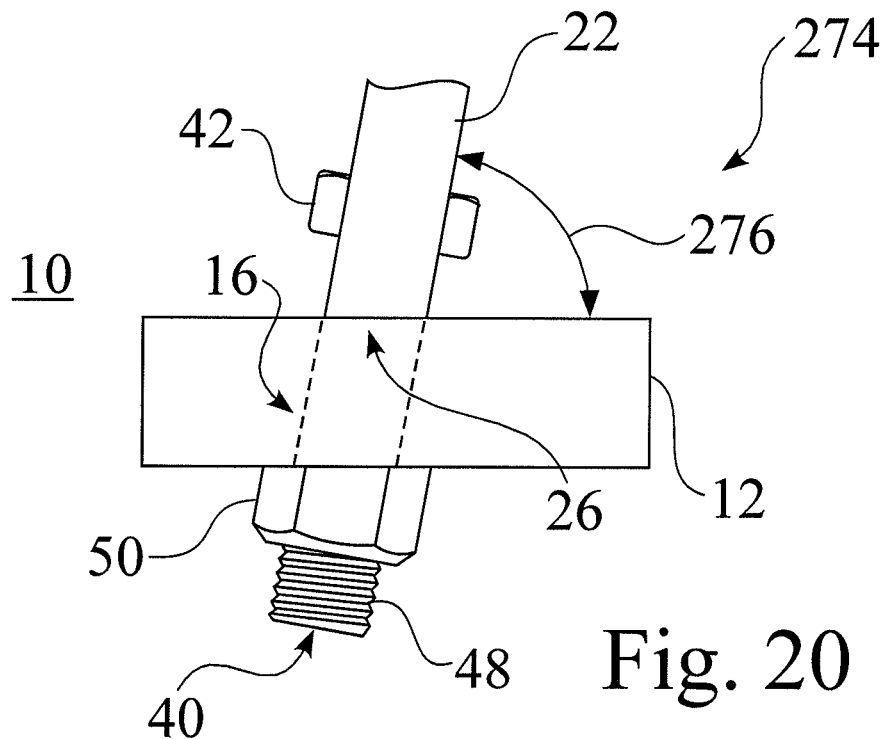
FIG. 20 shows a schematic side view of an exemplary captive fastener mechanism, wherein the first member and the second member are not orthogonal with respect to each other.

For example, FIG. 20 shows a schematic side view 274 of an exemplary captive bolt mechanism 10, wherein the first member 12 and the second member 22 are not orthogonal with respect to each other, such that their intersection angle 276 is not equal to 90 degrees. As seen in FIG. 20, the lower surface 26 of the second member 22 is beveled, while a bolt or screw 40 may be tightened from the top to a wedge shaped nut 50, or alternatively to a standard nut 50 using a beveled washer 54. While the exemplary embodiment 10 seen in FIG. 20 may require the hole 16 to be cut at an angle, such as by a five axis water jet, and further processing for the structure 10 beyond planar manufacturing processes, such as by secondary machining to create the beveled edge 26, this structure 10 may be suitable for a wide variety of applications.

Figure 21:
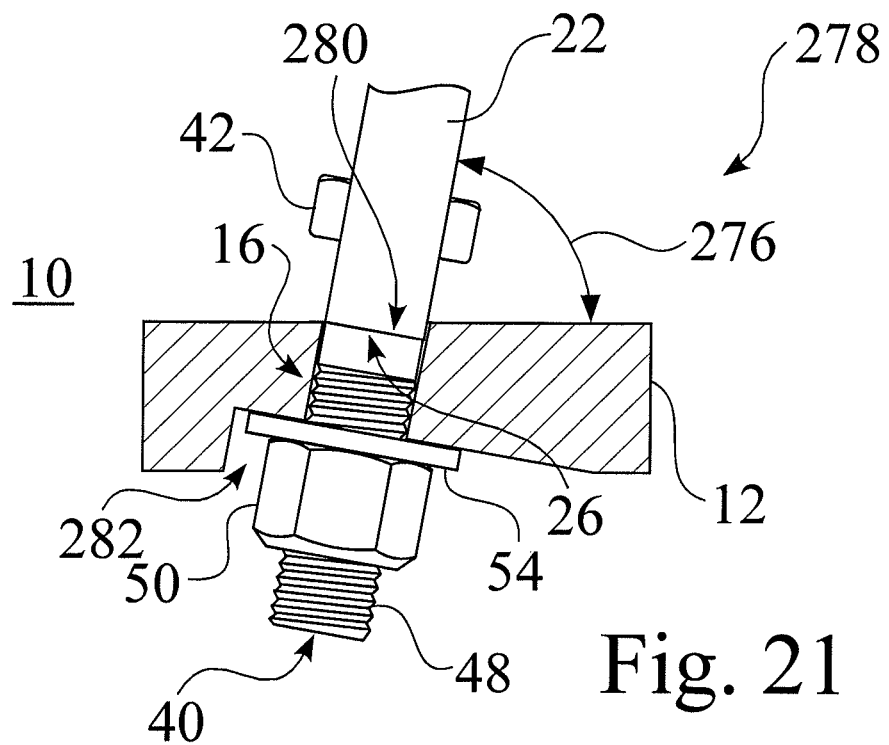
FIG. 21 shows a schematic side view of an alternate exemplary captive fastener mechanism, wherein the first member and the second member are not orthogonal with respect to each other.

FIG. 21 shows a schematic side view 278 of an alternate exemplary captive fastener mechanism 10, wherein the first member 12 and the second member 22 are not orthogonal with respect to each other. As seen in FIG. 21, the first member 12 comprises beveled grooves 280 and 282 on opposing surfaces of the first member 12, and the hole 16 through the first member 12 allows the bolt 40, and optionally a tenon region 27 (FIGS. 7, 26), to extend through the first member 12 at an inclined angle 276. As above, while the exemplary embodiment 10 seen in FIG. 21 may require further the hole 16 to be cut at an angle, such as by a five axis water jet, and further processing for the structure 10 beyond planar manufacturing processes, such as by secondary machining to create the bevels 280,282, this structure 10 may additionally be suitable for a wide variety of applications.

Figure 22:
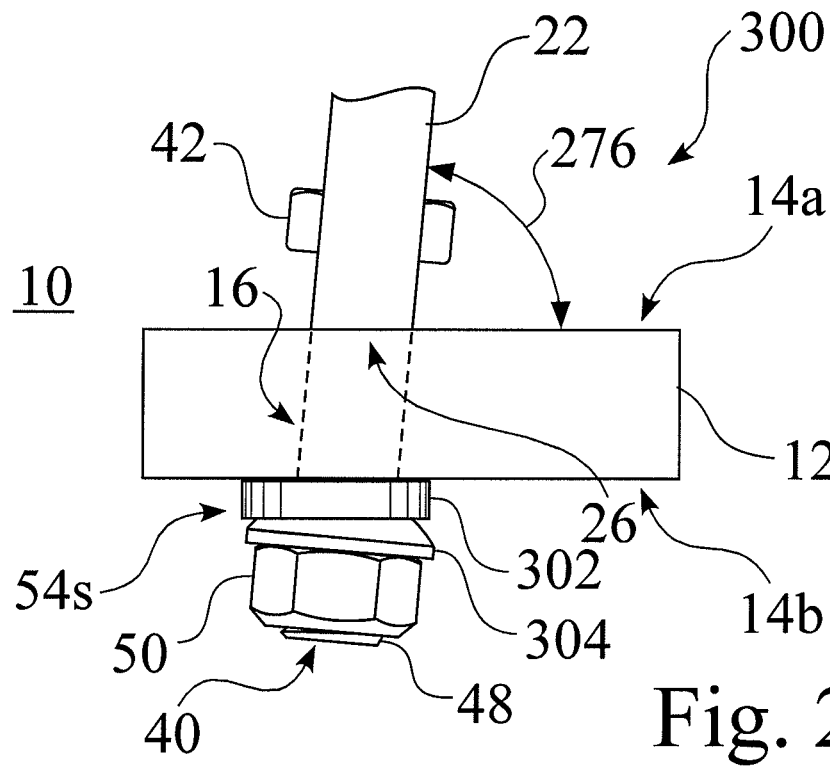
FIG. 22 shows a schematic side view of an exemplary captive fastener mechanism, wherein the first member and the second member are not orthogonal with respect to each other, and wherein the fastener assembly further comprises a spherical washer assembly.
Figure 23:
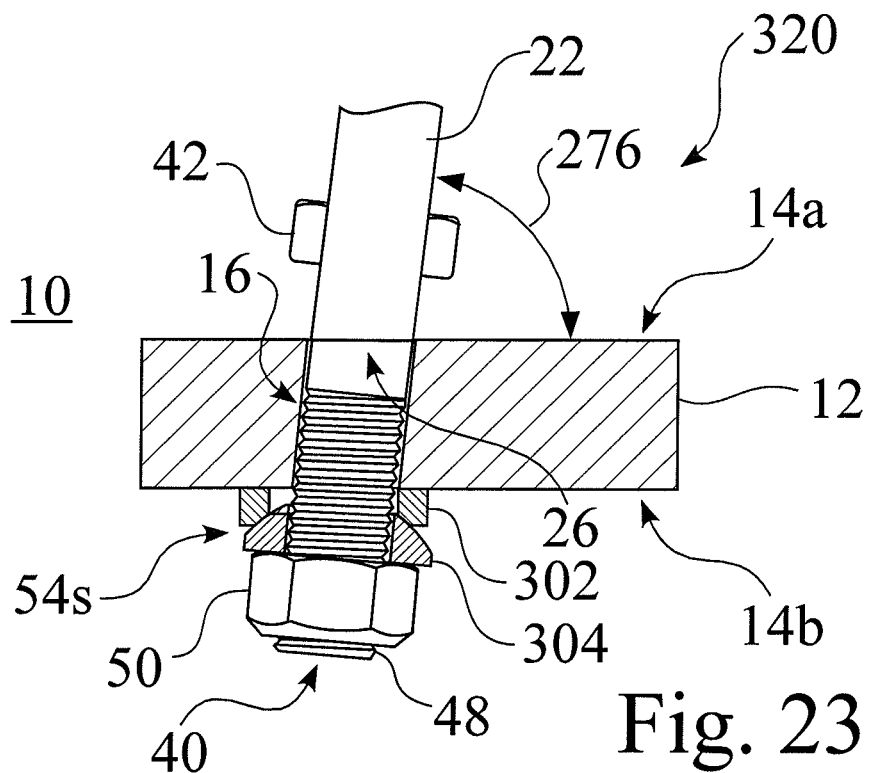
FIG. 23 shows a schematic side view of an alternate exemplary captive fastener mechanism, wherein the first member and the second member are not orthogonal with respect to each other, and wherein the fastener assembly further comprises a spherical washer assembly.

FIG. 22 shows a schematic side view 300 of an exemplary captive fastener mechanism 10, wherein the first member 12 and the second member 22 are not orthogonal with respect to each other, and wherein the fastener assembly 40,50 further comprises a spherical washer assembly 54s, such as but not limited to comprising a spherical washer base 302 and a matching spherical washer active member 304. FIG. 23 shows a schematic side view 320 of an alternate exemplary captive fastener mechanism 10, wherein the first member 12 and the second member 22 are not orthogonal with respect to each other, and wherein the fastener assembly 40,50 further comprises a spherical washer assembly 54s, such as but not limited to comprising a spherical washer base 302 and a matching spherical washer active member 304. In some mechanism embodiments 10, he spherical washer assemblies 54s comprise DIN 6319-NI, such as available through J.W. Winco, Inc., of New Berlin, Wis.

The first member 12 seen in FIG. 22 and FIG. 23 is not required to include a beveled landing on the first surface 14a and/or the second surface 14b, even though the first member 12 and the second member 22 are not orthogonal with respect to each other, since the spherical washer assembly 54s compensates for an intersection angle 276 that is not equal to 90 degrees.

FIG. 24 shows a schematic side view 360 of an exemplary captive fastener mechanism 10b, wherein tightening of the fasteners with respect to each other provides a flaring out 362 of a tenon 27 within a mortise region 16.

FIG. 25 is a schematic view 380 of an alternate exemplary captive fastener mechanism 10a having a tapered slot 28 and tapered fastener 40 slidably positioned therein, wherein tightening of the fasteners 40,50 with respect to each other provides a flaring out 362 of a tenon 27 within a mortise region 16, such as to bind the tenon 27 against the interior surfaces of the mortise 16, to provide additional strength and rigidity. As seen in FIG. 25, the tapered surfaces of the fastener slot 28 against which the bolt head 42 bears may therefore encourage such flaring 362.

Figure 26:
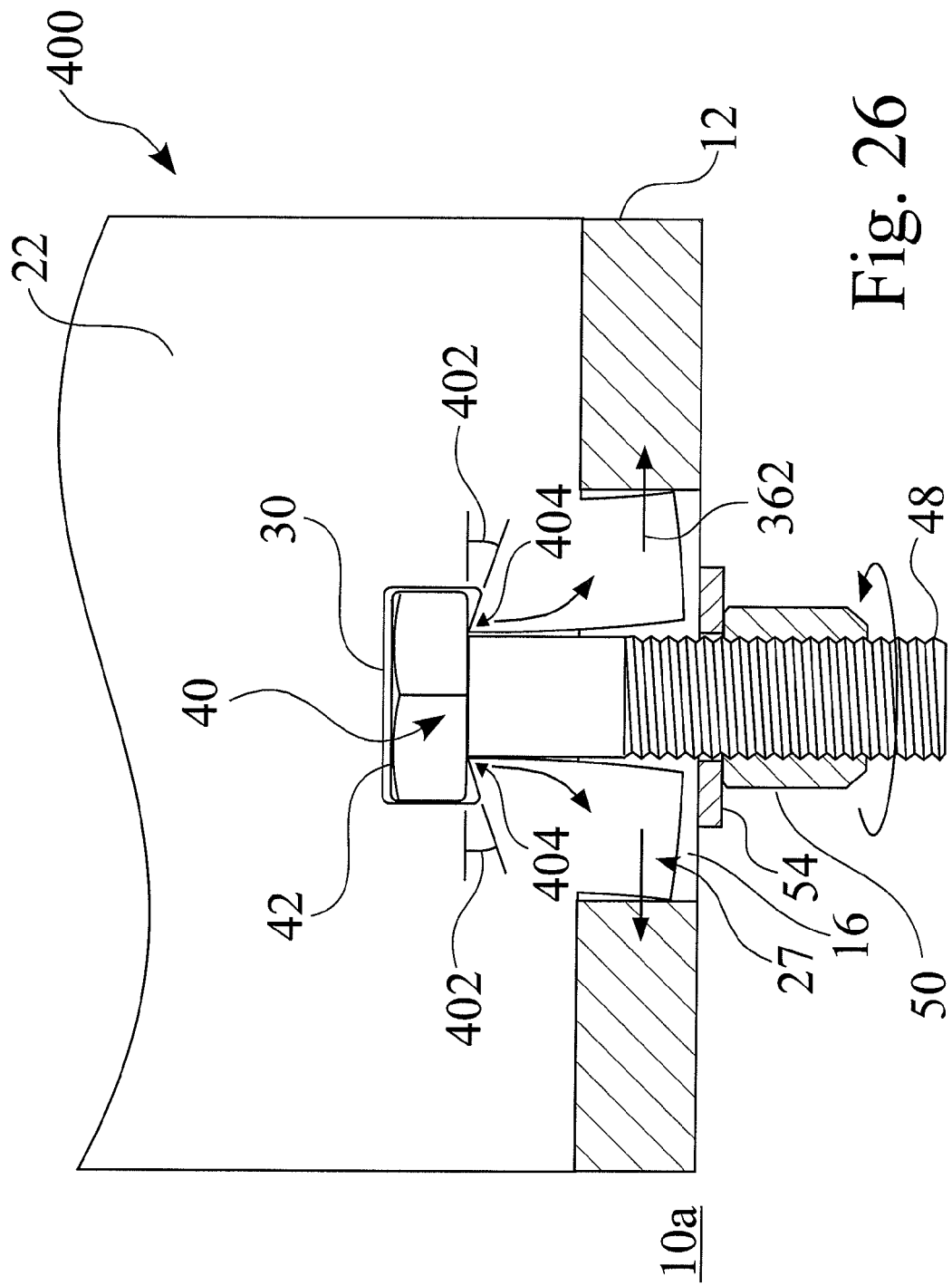
FIG. 26 is a schematic view of an alternate exemplary captive fastener mechanism having a captive fastener region that may preferably be shaped to promote a flaring out of a tenon within a mortise region.

FIG. 26 is a schematic view 400 of an alternate exemplary captive fastener mechanism 10 having a fastener region 30 that may preferably be shaped to promote a flaring out of a tenon 27 within a mortise region 16, such as to bind the tenon 27 against the interior surfaces of the mortise 16, to provide additional strength and rigidity. As seen in FIG. 26, the surface of the fastener region 30 of the fastener slot 28 against which the bolt head 42 bears defines an angle 402 that promotes flaring 362.

In many embodiments of the fastener mechanism 10, the angle 402 may typically be about zero degrees, such as to promote a large surface area for distributed contact with a fastener 40 having a flat bottom surface. However, in the exemplary embodiment 10 shown in FIG. 24, the angle 402 may be greater than zero degrees, e.g. to provide a focused region of contact with the fastener 40 having a standard flat bottom surface. The modification of the shape of the fastener region 30 helps to induce the flaring 362.

The taper angle 402 induces preferential contact along a region 404, such as comprising a ring, or annulus with deformation.

Figure 27:
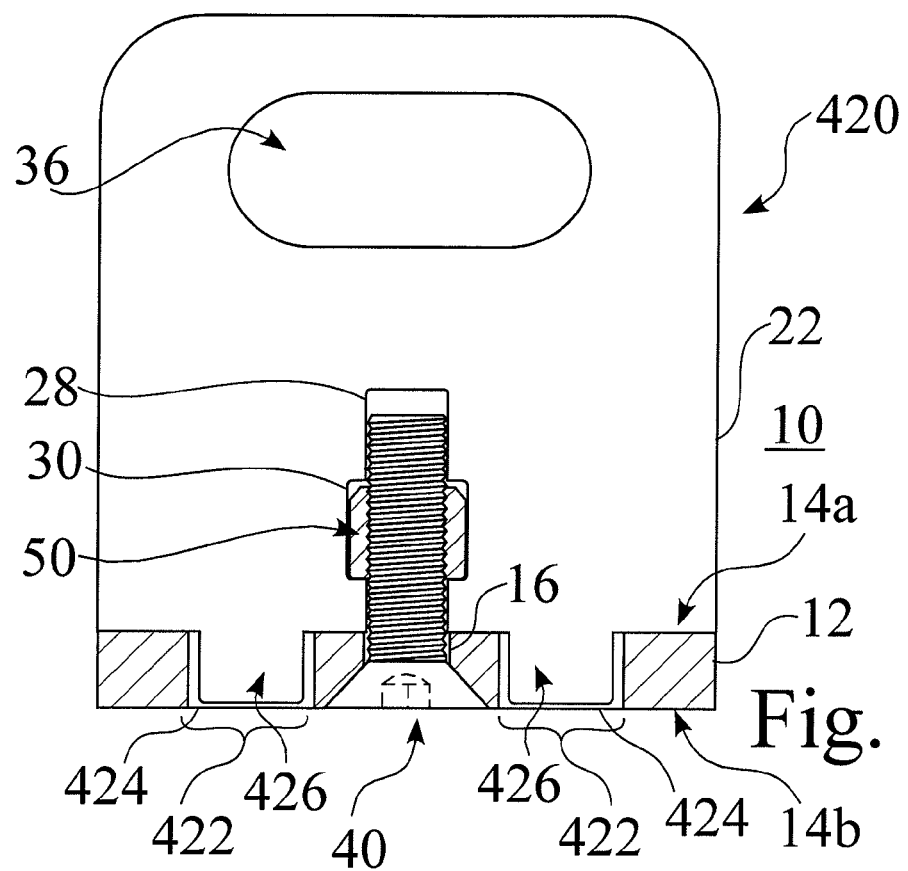
FIG. 27 is a partial cutaway view of an alternate embodiment of a captive fastener mechanism for joining planar members, having one or more mortise and tenon joints that are independent of the captive fastener.
Figure 28:
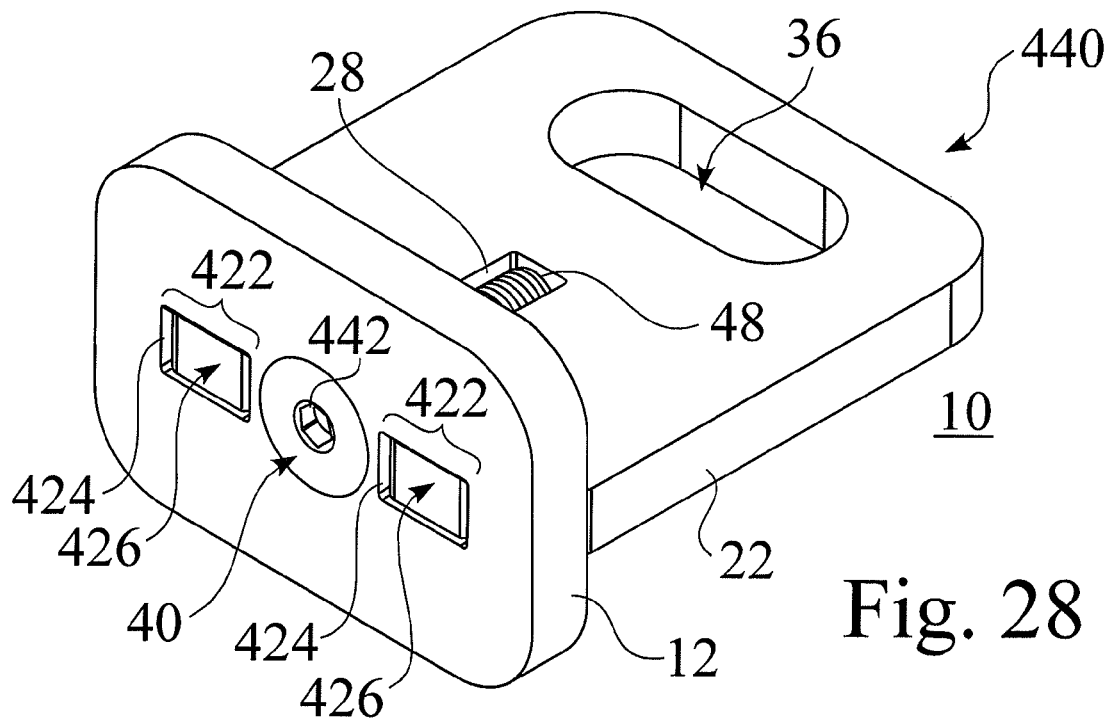
FIG. 28 is a back perspective view of an alternate embodiment of a captive fastener mechanism for joining planar members, having one or more mortise and tenon joints that are independent of the captive fastener.

FIG. 27 is a partial cutaway view 420 of an alternate embodiment of a captive fastener mechanism 10 for joining planar members 12,22, having one or more mortise and tenon joints 422 that are independent of the captive fastener assembly 40,50, i.e. separate from the hole 16. FIG. 28 is a back perspective view 440 of an alternate embodiment of a captive fastener mechanism 10 for joining planar members 12,22, having one or more mortise and tenon joints 422 that are independent of the captive fastener assembly 40,50.

As seen in FIG. 27 and FIG. 28, the first member 12 comprises one or more mortises 424 defined between the first surface 14a and the second surface 14b of the first member 12. As well, the second member 22 seen in FIG. 27 and FIG. 28 further comprises tenons 426 that extend from the lower end surface 26 to mate to corresponding mortises 424, thereby forming one or more mortise tenon joints 422.

The exemplary fastener 40 seen in FIG. 27 and FIG. 28 comprises a countersunk Allen head bolt or screw 40, such as having an Allen key tool access 442. While such a captive fastener mechanism 10 may require secondary machining to form the corresponding countersink detail on the second surface 14b of the first member 12, most of the structure 10 may typically be formed by planar processes. As well, alternate structures 10, e.g. 10a,10b that include one or more mortise and tenon joints 422 may comprise a wide variety of fasteners 40 and 50, and do not necessarily require a countersunk Allen head bolt or screw 40.

FIG. 29 is a flowchart for an exemplary assembly process 500 for an exemplary captive fastener mechanism 10a, wherein the process 500 typically comprises the steps of providing 502 a first member 12 having a hole 16 defined there through, providing 504 a second member 22 having a planar end surface 26 and a fastener slot 28 extending away from the planar end surface 26, slidably placing 506 a bolt 40 in the slot 28 of the second member 22, wherein a portion of the shaft 46 of the bolt 40 extends beyond the planar end surface 26, positioning 508 the second member 22 against the first member 12, wherein the end of the shaft of the bolt 40 extends through the hole 16, and fastening 510 a nut 50 to the extended end of the bolt 40, optionally with a washer 54.

FIG. 30 is a flowchart for an exemplary assembly process 520 for an exemplary captive fastener mechanism 10b, wherein the process 520 typically comprises the steps of providing 522 a first member 12 having a hole 16 defined there through, providing 524 a second member 22 having a planar end surface 26 and a fastener slot 28 extending away from the planar end surface 26, slidably placing 526 a nut 50 in the slot 28 of the second member 22, positioning 528 the second member 22 against the first member 12, and fastening 530 a bolt 40 to the captive nut 50 through the hole 16 and the slot 28, optionally with a washer 54.

The captive fastener mechanism structures 10 and associated processes provide joints between substantially planar construction members in a manner that is easily assembled, highly rigid, and easily disassembled.

The captive fastener mechanism structures 10 and associated processes also allow for repeated assembly and disassembly without loss of rigidity. As well, the captive fastener mechanism structures 10 and associated processes do not typically require secondary machining beyond that achievable by typical planar manufacturing processes.

In some embodiments of the captive fastener mechanism structures 10, washers 54 are preferably used for the fastener assemblies 40,50, such as if the nut 50 threaded onto the shaft 46 does not span the mortise 16 in the first member 12, i.e. if diameter of the nut 50 is not substantially greater than the thickness 23 (FIG. 1) of the second member 22.

While some embodiments of the structures and systems disclosed herein are implemented with nuts and screws or bolts, other embodiments may comprise a wide variety of fastening hardware, such as bolts or screws specifically designed for integration with the assembly, and/or a wide variety of hardware suitable for attachment to the bolts, such as but not limited to locknuts, clips, retainers, pins, and/or dowels.

As well, while some embodiments of the structures and systems disclosed herein provide captive fastener structures for permanent or removable assembly of components, other embodiments may provide captive fastener structures for temporary attachment, such as but not limited to providing temporary jigs to hold components together in relation to each other, such as during other processing, e.g. temporary or sacrificial jigs for welding or adhesion between members.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

The invention claimed is:

1. A structure, comprising:
a first planar member having a first planar surface and a second planar surface opposite the first planar surface, and a mortise defined there through between the first planar surface and the second planar surface;
a second planar member having a first planar side and a second planar side opposite the first planar side, a planar end surface extending from the first planar side to the second planar side, a slot defined between the first planar side and the second planar side and extending from the planar end surface, and a fastener region defined in the slot between the first planar side and the second planar side, wherein the fastener region extends outward from opposing faces of the slot and comprises fastener retaining surfaces and opposing sides, wherein the fastener retaining surfaces are disposed between the opposing faces of the slot and the opposing sides of the fastener region, and wherein the fastener retaining surfaces are inclined toward the planar end surface as the fastener retaining surfaces extend from the opposing faces of the slot toward the opposing sides of the fastener region, such that an apex is formed where the opposing faces of the slot meet the fastener retaining surfaces;
a first fastener that is positionable within the fastener region, wherein the first fastener comprises an axis, and a flat contact face, wherein the flat contact face is orthogonal to the axis; and
a second fastener that is threadably fastenable to the first fastener when the planar end surface of the second planar member is positioned toward the first planar surface of the first planar member, wherein the slot is aligned with the mortise, and wherein one of the first fastener and the second fastener comprises a threaded shaft having a defined diameter, wherein the threaded shaft extends through the mortise and the slot and threadably engages with the other of the first fastener and the second fastener;
wherein the second planar member further comprises a tenon that extends beyond the planar end surface towards the first planar member, wherein the slot extends through the tenon, wherein the tenon fits within the mortise of the first planar member when the planar end surface of the second planar member contacts the first planar surface of the first planar member, and wherein the apices of the fastener retaining surfaces define a region of contact with the flat contact face of the first fastener, wherein the region of contact comprises less than the entire flat contact face of the first fastener, and wherein threadably engaging the first fastener with the second fastener causes the flat contact face of the first fastener to engage the apices of the fastener retaining surfaces, thereby moving the tenon outward from the axis of the first fastener within the mortise, wherein at least a portion of the tenon contacts one or more interior surfaces of the mortise.

2. The structure of claim 1, wherein the first fastener has a pair of opposing faces;
wherein the opposing faces of the first fastener are slidably confinable between the opposing sides of the fastener region;
wherein the defined thickness of the second planar member is greater than or equal to the defined diameter of the threaded shaft; and
wherein the distance between the opposing sides of the fastener region is chosen to rotatably constrain the opposing faces of the first fastener, and provide a press-fit between the opposing sides of the fastener region and the opposing faces of the first fastener to prevent inadvertent ejection of the first fastener before the first fastener is threadably fastened to the second fastener.

3. The structure of claim 2, wherein the opposing sides of the second planar member contact the entirety of the opposing faces of the first fastener to provide the press-fit.

4. The structure of claim 1, wherein the first fastener comprises a bolt having a head, wherein the threaded shaft extends from the head to a leading end, wherein the threaded shaft comprises fastener threads that extend from the leading end toward the head, and wherein the second fastener comprises a nut.

5. The structure of claim 4, further comprising:
a washer having a hole defined there through, wherein the washer is located between the second planar surface of the first planar member and the nut, and wherein the threaded shaft of the bolt extends through the hole of the washer.

6. The structure of claim 1, wherein the first fastener comprises a head having a polygonal shape having an even number of sides.

7. The structure of claim 1, wherein the fastener region further defines an access region in relation to any of the side and the top of the first fastener for access of a tool that is connectable to the first fastener.

8. The structure of claim 7, wherein the tool comprises any of a wrench, a socket, a ratchet, and a driver.

9. The structure of claim 1, wherein the second fastener comprises a bolt having a head, wherein the threaded shaft extends from the head to a leading end, wherein the threaded shaft comprises fastener threads that extend from the leading end toward the head, and wherein the first fastener comprises a nut.

10. The structure of claim 9, further comprising:
a washer having a hole defined there through, wherein the washer is located between the second planar surface of the first planar member and the head, and wherein the threaded shaft of the bolt extends through the hole of the washer.

11. The structure of claim 1, wherein any of the first planar member and the second planar member is formed by at least one planar manufacturing process.

12. The structure of claim 1, wherein the first planar member and the second planar member are orthogonal to each other.

13. The structure of claim 1, wherein the second planar member is inclined at an angle with respect to the first planar member, wherein the angle is less than ninety degrees.

* * * * *